United States Patent
Heo et al.

(10) Patent No.: US 9,379,404 B2
(45) Date of Patent: Jun. 28, 2016

(54) ELECTROLYTE MEMBRANE FOR FUEL CELL, ELECTRODE FOR FUEL CELL, AND FUEL CELL EMPLOYING THE SAME

(71) Applicants: Samsung Electronics Co., Ltd., Suwon-si, Gyeonggi-do (KR); National University Corporation Nagoya University, Nagoya-shi, Aichi (JP)

(72) Inventors: Pil-won Heo, Yongin-si (KR); Ki-hyun Kim, Seoul (KR); Takashi Hibino, Nagoya (JP); Chan-ho Pak, Seoul (KR); Kyoung-hwan Choi, Seoul (KR)

(73) Assignees: SAMSUNG ELECTRONICS CO., LTD. (KR); NATIONAL UNIVERSITY CORPORATION NAGOYA UNIVERSITY (JP)

( * ) Notice: Subject to any disclaimer, the term of this patent is extended or adjusted under 35 U.S.C. 154(b) by 272 days.

(21) Appl. No.: 13/874,825

(22) Filed: May 1, 2013

(65) Prior Publication Data

US 2014/0134519 A1     May 15, 2014

(30) Foreign Application Priority Data

Aug. 24, 2012  (KR) .................. 10-2012-0093298

(51) Int. Cl.
*H01M 8/10* (2006.01)
*H01M 4/86* (2006.01)

(52) U.S. Cl.
CPC .......... *H01M 8/1023* (2013.01); *H01M 8/1039* (2013.01); *H01M 8/1048* (2013.01); *H01M 8/1067* (2013.01); *H01M 4/8663* (2013.01); *Y02E 60/523* (2013.01)

(58) Field of Classification Search
None
See application file for complete search history.

(56) References Cited

U.S. PATENT DOCUMENTS

| 2010/0323275 | A1 | 12/2010 | Machida et al. |
| 2011/0262839 | A1* | 10/2011 | Kang ............ B82Y 30/00 429/496 |
| 2013/0236813 | A1 | 9/2013 | Heo et al. |

FOREIGN PATENT DOCUMENTS

| JP | 2000001315 A | * | 1/2000 |
| JP | 2011-165347 A |   | 8/2011 |

OTHER PUBLICATIONS machine translation of Watanabe et al. JP 2000-001315 A (2000).*
Ganguly et al. Nanoscale Res Lett (2008) 3:36-44.*
Shen et al. J. Mater. Chem., 2012, 22, 14907 (May 2012).*
Byung-Kil Park et al., Organic/inorganic Hybrid Electrolytes for the Application of Direct Methanol Fuel Cell (DMFC)—Preparation and Properties of Sulfonated SEBS (SSEBS)—clay Hybrid Membranes - , Membrane Journal, vol. 15, No. 2, Jun. 2005, pp. 165-174.
Hae Young Hwang et al., Proton Conduction and Methanol Transport through sulfonated Poly(styrene-b-ethylene/butylene-b-styrene)/Clay Nanocomposite, Macromolecular Research,2011, vol. 19, No. 1, pp. 84-89.
Youngcheng Jin et al., "High Temperature, Low Humidity Proton Exchange Membrane BAsed on an Inorganic-Organic Hybrid Structure", Electrochemical and Solid-State letters, 13(2), 2010, pp. B8-B10.

* cited by examiner

*Primary Examiner* — Carlos Barcena
*Assistant Examiner* — Wojciech Haske
(74) *Attorney, Agent, or Firm* — Cantor Coburn LLP

(57) ABSTRACT

An electrolyte membrane for a fuel cell includes: an inorganic ionic conductor including a trivalent metal element, a pentavalent metal element, phosphorous, and oxygen; and a polymer.

28 Claims, 14 Drawing Sheets

US 9,379,404 B2

ELECTROLYTE MEMBRANE FOR FUEL CELL, ELECTRODE FOR FUEL CELL, AND FUEL CELL EMPLOYING THE SAME

This application claims priority to Korean Patent Application No. 10-2012-0093298, filed on Aug. 24, 2012, and all the benefits accruing therefrom under 35 U.S.C. §119, the content of which in its entirety is herein incorporated by reference.

BACKGROUND

1. Field

The present disclosure relates to an electrolyte membrane and an electrode for a fuel cell, and a fuel cell including the same.

2. Description of the Related Art

According to the types of an electrolyte and fuel used, fuel cells can be classified as polymer electrolyte membrane fuel cells ("PEMFC"s), direct methanol fuel cells ("DMFC"s), phosphoric acid fuel cells ("PAFC"s), molten carbonate fuel cells ("MCFC"s), or solid oxide fuel cells ("SOFC"s).

SOFCs are known to be suitable for use in decentralized power supplies, due to their high electrical efficiency and operability with a variety of fuels, including lower purity gaseous fuels. However, to sustain operation at high temperatures, SOFCs have been formed of high-priced materials which are durable in high-temperature environments. Also, it is not easy to rapidly switch an SOFC from ON to OFF and vice versa if a high temperature is used. In this sense, current SOFCs are not suitable for various applications, such as portable or vehicular power sources. Therefore, research to provide an SOFC which can operate at lower temperatures is being actively conducted.

PEMFCs operating at 100° C. or higher temperatures in non-humidified conditions, unlike those operable at low temperatures, do not need a humidifier, and are known to be convenient in terms of water management, and can be highly reliable in terms of system operation. Furthermore, such PEMFCs may become more resistant to carbon monoxide (CO) poisoning that may occur at a fuel electrode as they operate at high temperatures, and thus, a simplified reformer may be used. These advantages mean that PEMFCs are increasingly drawing attention for use in such high-temperature, non-humidifying systems.

Along with the current trends for lowering the operation temperature of SOFCs and increasing the operation temperature of PEMFCs as described above, fuel cells operable in a moderate temperature range are drawing more attention.

However, electrolyte membranes developed so far do not have a satisfactory conductivity in the above temperature ranges, at low-humidity, or in unhumidified conditions, and thus, there is still a demand for improvement.

SUMMARY

Provided are an electrolyte membrane and an electrode for a fuel cell that have improved conductivity and are thermally and mechanically stable, and a fuel cell including the electrolyte membrane or the electrode.

Additional aspects will be set forth in part in the description which follows and, in part, will be apparent from the description.

According to an aspect of the present disclosure, an electrolyte membrane for a fuel cell includes: an inorganic ionic conductor including a trivalent metal element, a pentavalent metal element, phosphorus, and oxygen; and a polymer.

According to another aspect of the present disclosure, an electrode for a fuel cell includes: an inorganic ionic conductor including a trivalent metal element, a pentavalent metal element, phosphorus, and oxygen; and a polymer.

According to yet another aspect of the present disclosure, a fuel cell includes the above-described electrolyte membrane.

According to still another aspect of the present disclosure, a fuel cell includes the above-described electrode.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
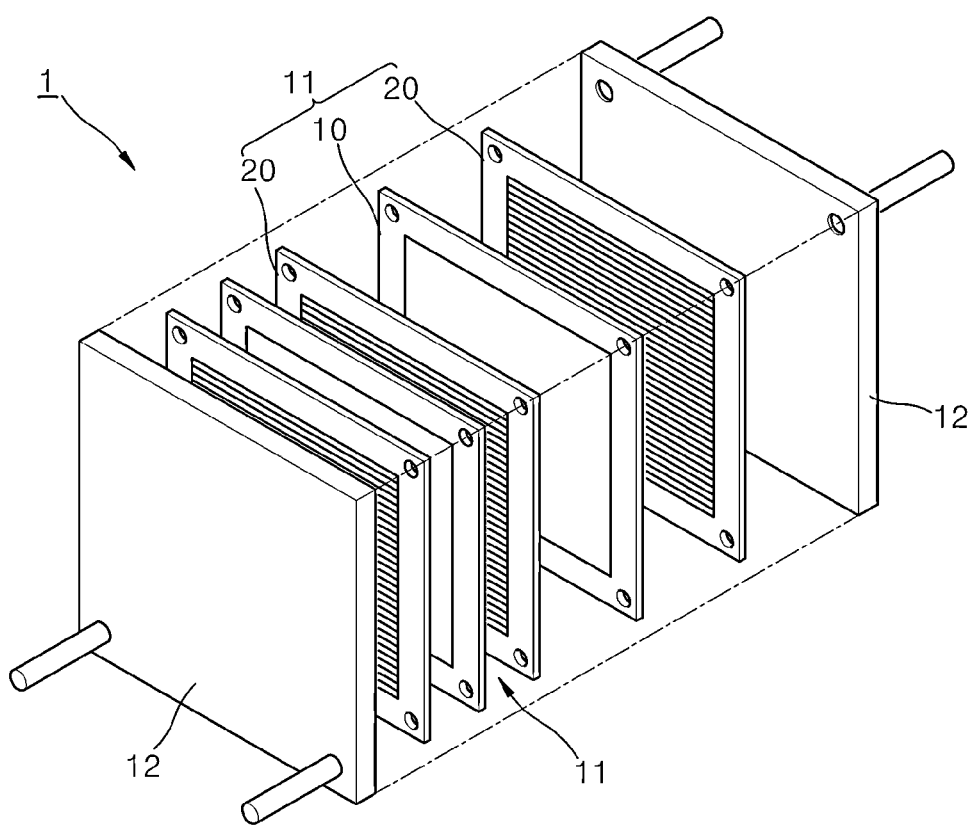
FIG. 1 is a perspective exploded view of an embodiment of a fuel cell.

Reference will now be made in detail to embodiments, examples of which are illustrated in the accompanying drawings, wherein like reference numerals refer to the like elements throughout. In this regard, the present embodiments may have different forms and should not be construed as being limited to the descriptions set forth herein. Accordingly, the embodiments are merely described below, by referring to the figures, to explain aspects of the present description.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another element, component, region, layer, or section. Thus, a first element, component, region, layer, or section discussed below could be termed a second element, component, region, layer, or section without departing from the teachings of the present embodiments.

The terminology used herein is for the purpose of describing particular embodiments only and is not intended to be limiting. As used herein, the singular forms "a," "an" and "the" are intended to include the plural forms as well, unless the context clearly indicates otherwise. The term "or" means "and/or." As used herein, the term "and/or" includes any and all combinations of one or more of the associated listed items. Expressions such as "at least one of," when preceding a list of elements, modify the entire list of elements and do not modify the individual elements of the list.

It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

Unless otherwise defined, all terms (including technical and scientific terms) used herein have the same meaning as commonly understood by one of ordinary skill in the art to which this general inventive concept belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

"Mixture" as used herein is inclusive of all types of combinations, including blends, alloys, solutions, and the like.

According to an embodiment, there is provided an electrolyte membrane for a fuel cell, including: an inorganic ionic conductor including a trivalent metal element, a pentavalent metal element, phosphorus (P), and oxygen (O); and a polymer.

The polymer may be, for example, at least one selected from a hydrocarbon polymer, a fluorine polymer, and a sulfonated polymer, but is not limited thereto.

The polymer may have an ion-conducting functional group.

An introduction site of the ion-conducting functional group, i.e., a site at which the ion-conducting functional group is substituted, is not specifically limited. For example, the ion-conducting functional group may be directly bound to a backbone of the polymer, or to a side chain branching from the backbone of the polymer. In an embodiment, the ion-conducting functional group may be bound to a terminal end of a polymer backbone.

Examples of the ion-conducting functional group include at least one selected from a sulfonic acid group, a phosphoric acid group, an amino group (which as defined herein includes an amine group), a carboxylic acid group, and a salt of the foregoing groups.

A suitable molecular weight of the polymer may be chosen in consideration of the strength, formability, or processibility of the electrolyte membrane. The polymer may have a number average molecular weight (conversed as polystyrene) of from about 5,000 to about 1,000,000 Daltons (Da), specifically 10,000 to about 900,000 Da, more specifically about 20,000 to about 800,000 Da.

The hydrocarbon-based polymer may include about 80 weight percent (wt %) or greater of hydrocarbon-based repeating units. In an embodiment, the hydrocarbon-based polymer may include, for example, about 80 wt % to about 99.9 wt %, about 90 wt %, or about 95 wt % of the hydrocarbon-based repeating units. The hydrocarbon-based polymer includes a small percentage of an ion-conducting functional group such as at least one selected from a hydroxy group, a carboxylic acid group, a thiol group, a sulfonic acid group, a phosphoric acid group, an amino group, a salt of the foregoing groups, and the like, which may affect the performance of the electrolyte membrane. For example, the ion-conducting functional group, such as in the hydrocarbon-based polymer may be about 0.1 millimoles per gram (mmol/g) or less, and in an embodiment, about 0.05 mmol/g or less, specifically about 0.01 mmol/g, or about 0.1 mmol/g to about 0.0001 mmol/g.

An introduction site of the ion-conducting functional group is not specifically limited, and it may be directly bound to the backbone of the polymer, or to a side chain branching from the backbone of the polymer.

The hydrocarbon-based polymer may have a polymer backbone of, for example, an addition polymerization-based polymer, a polycondensation-based polymer, or a polyaddition-based polymer. It is appreciated that the scope of these polymers may overlap. Thus, a specific polymer may be listed under more than one category of the polymers.

Non-limiting examples of the addition polymerization-based polymer include at least one selected from a polyvinylaliphatic compound, a polyvinylaromatic compound, poly (meth)acrylic acid ester, polyvinyl ester, and a polyvinylether.

Non-limiting examples of the polycondensation-based polymer include at least one selected from polyether, polyamine, polysilane, polysiloxane, polyester, polyamide, polycarbonate, polyazomethine, polyhydrazide, polyacid anhydride, polythioester, polythiocarbonate, polyphosphoric acid ester, polyphenylene, polyketone, polysulfone, polyamide imide(polyamide imide), polyimide, polybenzothiazole, polyoxazole, polythiazole, polyimidazole, polypyrazole, polytriazine, and a polyquinoline.

Non-limiting examples of the polyaddition-based polymer include a polyurethane and a polyamide.

Non-limiting examples of the polyvinyl aliphatic compound include polymers derived from, for example, at least one selected from a C2-C8 alkene, a C5-C8 cycloalkene, and a C7-C10 vinyl cycloalkene. Non-limiting examples of the polyvinyl aromatic group include at least one selected from polystyrene, polyvinylnaphthalene, polyvinylanthracene, polyvinylphenanthrene, polyvinyl biphenyl, and poly(1-methyl-1-naphthyl ethylene). Non-limiting examples of the poly (meth)acrylic acid ester include poly(methyl(meth)acrylate) and poly(ethyl(meth)acrylate).

Non-limiting examples of the polyvinylether include polyisobutyl vinyl ether and polymethylvinyl ether.

Non-limiting examples of the C2-C8 alkene include at least one selected from ethylene, propylene, 1-butene, 2-butene, isobutene, 1-pentene, 2-pentene, 1-hexene, cyclopentene, cyclohexene, cyclooctane, and cyclooctene. Non-limiting examples of the C5-C8 cycloalkene include at least one selected from cyclopentene, cyclohexene, and cyclooctene. Non-limiting examples of the C7-C10 vinyl cycloalkene include at least one selected from vinyl cyclopentene, vinyl cyclohexene, and vinylcyclooctene.

The hydrocarbon-based polymer may include, for example, an aromatic repeating unit and an aliphatic repeating unit, which may be derived from an aromatic vinyl-based compound and an aliphatic vinyl-based compound, respectively.

The aromatic repeating unit and the aliphatic repeating unit may be in a weight ratio of from about 10:90 to about 50:50, and in an embodiment, from about 15:85 to about 45:55, and in another embodiment, from about 20:80 to about 40:60. When the weight ratio of the aromatic repeating unit to the aliphatic repeating unit is within these ranges, the electrolyte membrane may have improved mechanical characteristics and processibility.

A suitable ratio of the aromatic repeating unit to the aliphatic repeating unit as well as the arrangement of the aromatic and aliphatic repeating units in a primary structure, e.g., on a backbone, of the hydrocarbon-based polymer may be chosen in view of the strength, flexibility, processibility, or mechanical durability of the electrolyte membrane. For example, the same aromatic repeating unit may be at every terminal end of the primary structure of the hydrocarbon-based polymer. The hydrocarbon-based polymer can include a plurality, e.g., one or two kinds, of aliphatic repeating units between the aromatic repeating units. The arrangement of these repeating units may not be symmetric.

The aromatic repeating unit, which while not wanting to be bound by theory is understood to be related to the thermal resistance and strength of the electrolyte membrane, may be a repeating unit represented by Formula 1 below:

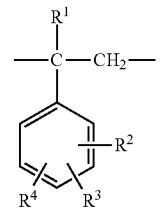

Formula 1

In Formula 1 above, $R^1$ may be at least one selected from a hydrogen atom, a substituted or unsubstituted C1-C10 alkyl group, and a substituted or unsubstituted C6-C20 aryl group; and $R^2$ to $R^4$ may be each independently be at least one selected from a hydrogen atom, a substituted or unsubstituted $C1-C_{10}$ alkyl group, a substituted or unsubstituted C6-C20 aryl group, and a substituted or unsubstituted C4-C20 carbocyclic group.

Non-limiting examples of the aromatic repeating unit include at least one selected from styrene, vinylnaphthalene, vinylanthracene, vinylphenanthrene, vinylbiphenyl, and 1-methyl-1-naphthylethylene.

The aliphatic repeating unit is a moiety derived from a polymer having a glass transition temperature or a softening point of about 50° C. or less, and in an embodiment, about 20° C. or less, and in another embodiment, 10° C. or less, and is able to form a flexible phase. The aliphatic repeating unit renders the electrolyte membrane flexible by forming the flexible phase, and thus may improve processability of a membrane-electrode assembly or a fuel cell during the manufacture of the membrane-electrode assembly or fuel cell.

Non-limiting examples of the aliphatic repeating unit are structures derived from at least one selected from a C2-C8 alkene, a C5-C8 cycloalkene, a C7-C10 vinyl alkene, and a C7-C10 vinyl cycloalkene.

Non-limiting examples of the C2-C8 alkene include at least one selected from ethylene, propylene, 1-butene, 2-butene, isobutene, 1-pentene, 2-pentene, 1-hexene, 2-hexene, 1-octene, and 2-octene. Non-limiting examples of the C5-C8 cycloalkene include at least one selected from cyclopentene, cyclohexene, cyclopentene, and cyclooctene.

Non-limiting examples of the C7-C10 vinyl cycloalkane include at least one selected from vinylcyclopentane, vinylcyclohexane, and vinylcyclooctane. Non-limiting examples of the C7-C10 vinyl cycloalkene are vinylcyclopentene and vinylcyclooctene.

The aromatic repeating unit and the aliphatic repeating unit may have a cross-linked structure.

Non-limiting examples of the polymer include at least one selected from a styrene-alkylene-styrene copolymer, polyarylene ether sulfone ("PAES"), polyphenylsulfone, polysulfone, polyether ether ketone, and polyimide. In an embodiment, the polymer may be a styrene-alkylene-styrene copolymer, or a polyether ether ketone.

A non-limiting example of the styrene-alkylene-styrene copolymer is a block copolymer represented by Formula 2 below.

Formula 2

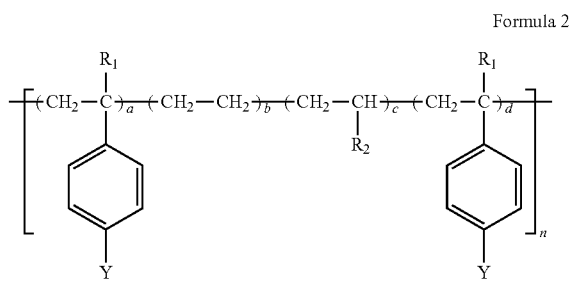

In Formula 2, $R_1$ and $R_2$ may be each independently be at least one selected from a hydrogen atom, a substituted or unsubstituted C1-C10 alkyl group, and a substituted or unsubstituted C6-C20 aryl group;

Y may be at least one selected from —$SO_3H$, —$PO_3H$, —$NH_2$, —COOH, and a salt thereof; and a may be about 5 to about 15 mole percent, a total of b and c may be about 70 to about 85 mole percent, c may be about 5 to about 15 mole percent, b and c may not be both zero, d may be about 5 to about 15 mole percent, and n is a degree of polymerization and may be about 5 to about 500.

When b and c are not both zero, a ratio by mole of b to c may be, for example, from about 1:99 to about 99:1.

The styrene-alkylene-styrene copolymer may have a number average molecular weight of from about 5,000 to about 1,000,000 Da, specifically 10,000 to about 900,000 Da, more specifically about 20,000 to about 800,000 Da.

An example of the hydrocarbon-based polymer is a styrene-ethylene-butylene-styrene block copolymer represented by Formula 3 below or a salt thereof.

Formula 3

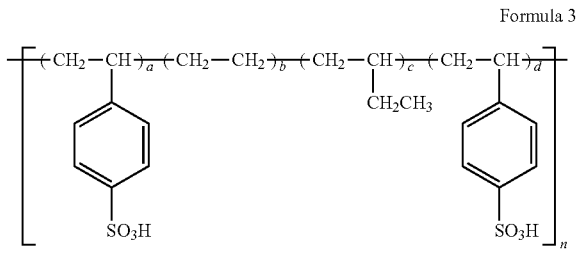

In Formula 3, a may be about 5 to about 15 mole percent, a total of b and c may be about 70 to about 85 mole percent, c may be about 5 to about 15 mole percent, d may be about 5 to about 15 mole percent, b and c are not both zero, and n is a degree of polymerization and may be about 5 to about 500.

When b and c are not both zero, a ratio by mole of b to c may be, for example, from about 1:99 to about 99:1.

The fluorine-based polymer may be at least one selected from polytetrafluoroethylene and polyvinylidene fluoride.

The sulfonated polymer may be at least one selected from Nafion, sulfonated polyarylene ether sulfone ("S-PAES"), sulfonated polyimide, and sulfonated polyetheretherketone ("S-PEEK"). A polymer content in the electrolyte membrane may be from about 5 parts to about 99 parts by weight, and in an embodiment, from about 10 parts to about 75 parts by weight, and in another embodiment, from about 30 parts to about 75 parts by weight, based on 100 parts by weight of the electrolyte membrane. When the polymer content is within these ranges, the electrolyte membrane may have improved conductivity and electrochemical characteristics without a reduction in mechanical characteristics.

The electrolyte membrane may include at least one selected from a softening agent, a stabilizer, an anti-static agent, a release agent, a flame retardant, a foaming agent, a pigment, a dye, a whitening agent, an inorganic filler, and the like.

The electrolyte membrane as an organo-inorganic composite membrane has improved conductivity in a wide range of temperatures in an unhumidified or low-humidity condition, and improved mechanical characteristics, for example, in terms of elongation rate and tensile strength, and improved electrochemical characteristics, for example, in terms of open circuit voltage, area specific resistance, and output density, and improved thermal stability.

The electrolyte membrane may be suitable for use in a high-temperature, low-humidity environment, and may be suitable for use in a polymer electrolyte membrane fuel cell (PEMFC).

The electrolyte membrane may have a thickness of from about 15 μm to about 100 μm.

The substituents in the formulas disclosed herein are defined as follows.

As used herein, the term "alkyl" indicates a completely saturated, branched or unbranched (or a straight or linear) hydrocarbon.

Non-limiting examples of the "alkyl" group include methyl, ethyl, n-propyl, isopropyl, n-butyl, isobutyl, sec-butyl, t-butyl, isopentyl, neopentyl, iso-amyl, n-hexyl, 3-methylhexyl, 2,2-dimethylpentyl, 2,3-dimethylpentyl, and n-heptyl.

At least one hydrogen atom in the "alkyl" group may be substituted with a halogen atom, a C1-C20 alkyl group substituted with a halogen atom (for example, $CCF_3$, $CHCF_2$, $CH_2F$, $CCl_3$, and the like), a C1-C20 alkoxy group, a C2-C20 alkoxyalkyl group, a hydroxy group, a nitro group, a cyano group, an amino group, an amidino group, a hydrazine, a hydrazone, a carboxyl group or a salt thereof, a sulfonyl group, a sulfamoyl group, a sulfonic acid group or a salt thereof, a phosphoric acid group or a salt thereof, a C1-C20 alkyl group, a C2-C20 alkenyl group, a C2-C20 alkynyl group, a C1-C20 heteroalkyl group, a C6-C20 aryl group, a C7-C20 arylalkyl group, a C6-C20 heteroaryl group, a C7-C20 heteroarylalkyl group, a C6-C20 heteroaryloxy group, or a C7-C20 heteroaryloxyalkyl group.

As used herein, the term "aryl" group, which is used alone or in combination, indicates an aromatic hydrocarbon containing at least one ring.

The term "aryl" is construed as including a group with an aromatic ring fused to at least one cycloalkyl ring.

Non-limiting examples of the "aryl" group include phenyl, naphthyl, and tetrahydronaphthyl.

At least one hydrogen atom of the "aryl" group may be substituted with one or more substituents that are the same as those recited above for the alkyl group.

"Alkoxy" as used herein indicates an alkyl group that is linked via an oxygen (i.e., alkyl-O—), for example methoxy, ethoxy, and sec-butyloxy groups.

"Aryloxy" as used herein indicates an aryl moiety that is linked via an oxygen (i.e., —O-aryl).

"Alkenyl" as used herein indicates a straight or branched chain, monovalent hydrocarbon group having at least one carbon-carbon double bond (e.g., ethenyl (—HC=$CH_2$)).

"Alkynyl" as used herein a straight or branched chain, monovalent hydrocarbon group having at least one carbon-carbon triple bond (e.g., ethynyl).

"Salt" as used herein indicates any organic or inorganic salt of any basic (e.g., amino) or acidic compound.

Basic compounds that form an acid addition salt include, for example, compounds comprising an amino group. Examples of inorganic acids that form salts with an amino group include hydrochloric, hydrobromic, sulfuric and phosphoric acids, as well as metal salts such as sodium monohydrogen, orthophosphate and potassium hydrogen sulfate. Examples of organic acids that form salts with an amino group include mono-, di-, and tricarboxylic acids such as glycolic, lactic, pyruvic, malonic, succinic, glutaric, fumaric, malic, tartaric, citric, ascorbic, maleic, benzoic, phenylacetic, cinnamic and salicylic acids, as well as sulfonic acids such as p-toluene sulfonic and methanesulfonic acids. Either the mono or di-acid salts can be formed.

Acidic compounds that form a salt include, for example, compounds comprising a carboxylic acid, sulfonic acid, or phosphoric acid group. Examples of inorganic bases that form salts with an acidic group include lithium, sodium, potassium, calcium, and magnesium or barium hydroxide. Examples of organic bases that form a salt with an acidic group include aliphatic, carbocyclic or aryl organic amines such as methylamine, trimethylamine and picoline, alkylammonias or ammonia.

The formation of a desired compound salt is achieved using standard techniques. For example, the neutral compound is treated with an acid or base in a suitable solvent and the formed salt if desired is isolated by filtration, extraction or any other suitable method. The salt may be obtained by known ion-exchange procedures.

"Amino" as used herein indicates a group of the formula —$N(R)_2$, wherein each R is independently hydrogen, a C1-C6 alkyl, or a C6-C12 aryl. An amine group (—$NH_2$) can be specifically mentioned.

As used herein, the term "carbocyclic" group indicates a saturated or partially unsaturated non-aromatic monocyclic, bicyclic or tricyclic hydrocarbon group.

Non-limiting examples of the monocyclic hydrocarbon group include cyclopentyl, cyclopentenyl, cyclohexyl, and cyclohexenyl.

Non-limiting examples of the bicyclic hydrocarbon group include bornyl, decahydronaphthyl, bicyclo[2.1.1]hexyl, bicyclo[2.2.1]heptyl, bicyclo[2.2.1]heptenyl, and bicyclo[2.2.2]octyl.

An example of the tricyclic hydrocarbon group is an adamantyl.

At least one hydrogen atom of the "carbocyclic group" may be substituted with substituents that are the same as those recited above for the alkyl group.

The prefix "hetero" means that the compound or group includes at least one a heteroatom (e.g., 1, 2, or 3 heteroatom(s)), wherein the heteroatom(s) is each independently N, O, S, Si, or P.

Hereinafter, a method of manufacturing the above-described electrolyte membrane for a fuel cell will be described.

An inorganic ionic conductor and a polymer are mixed together in a solvent to obtain a composition for forming the electrolyte membrane.

The composition can be applied to a substrate by various methods, for example, by at least one selected from dipping, spray coating, screen printing, coating using a doctor blade, coating using Gravure coating, dip coating, roll coating, comma coating, and silk screening.

In specific embodiments, forming a membrane may involve applying the composition onto a substrate, spreading the composition over the substrate, for example, using a coater, such as a doctor blade, and drying the substrate coated with the composition at a predetermined temperature to form a membrane having a predetermined thickness.

In the mixing of the inorganic ionic conductor, the polymer, and the solvent, the order of adding these components, and the kind of the solvent used are not specifically limited.

The drying may be performed at from room temperature (e.g., 20-25° C.) to about 250° C., and in an embodiment, at a temperature of from about 70° C. to about 150° C. When the thermal treatment temperature is within these ranges, the electrolyte membrane may have improved conductivity and a uniform thickness without a reduction in mechanical strength.

Non-limiting examples of the solvent include at least one selected from tetrahydrofuran, N-methylpyrrolidone, and N,N'-dimethylacetamide ("DMAC").

An amount of the solvent may be from about 500 to about 1300 parts by weight based on 100 parts by weigh of the polymer. When the amount of the solvent is within this range, the composition may have an appropriate viscosity with a solid content of from about 15 wt % to about 30 wt %, and may improve workability when used to form the electrolyte membrane.

In an embodiment, the composition may be disposed (e.g., coated) on a substrate and dried to form a film, which is then separated from the substrate, thereby obtaining an electrolyte membrane.

The substrate is not specifically limited. For example, the substrate may be any of a variety of supports, such as a glass substrate, a release film, or an anode electrode, which may be selected depending on the membrane preparation process.

Non-limiting examples of the release film include at least one selected from a polytetrafluoroethylene film, a polyvinylidenefluoride film, a polyethyleneterepthalate film, and a MYLAR film.

The electrolyte membrane manufactured through the above processes may be supplied with a proton conductor.

The proton conductor may be, for example, a phosphoric acid-based material.

When the phosphoric acid-based material is supplied, the reaction temperature may be from about 30° C. to about 120° C., and in an embodiment, about 60° C.

The phosphoric acid-based material may be supplied to the electrolyte membrane in any of a variety of manners. For example, the electrolyte may be immersed in the phosphoric acid-based material.

As the phosphoric acid-based material, phosphoric acid, phosphonic acid, or the like may be used.

The electrolyte membrane prepared through the above-described processes may have a thickness of about 1 μm to about 100 μm, and in an embodiment, may have a thickness of about 15 μm to about 100 μm. The electrolyte membrane may be formed as a thin film within these thickness ranges.

When the thickness of the electrolyte membrane is within these ranges, an open circuit voltage may be about 1V or higher at 150° C. in an unhumidified condition, an area specific resistance may be from about 0.7 Ωcm² to about 1.4 Ωcm² at 150° C. in an unhumidified condition.

The electrolyte membrane may be used in a fuel cell working in a wide range of temperatures in an unhumidified condition. For example, the electrolyte membrane may be used in a PEMFC working at a temperature of about 100-150° C. in a low-humid condition with a relative humidity of about 40% or less or in an unhumidified condition.

The inorganic ionic conductor of the electrolyte membrane for a fuel cell includes a trivalent metal element, a pentavalent metal element, phosphorus (P), and oxygen (O).

The trivalent metal element may be at least one selected from aluminum (Al), iron (Fe), gallium (Ga), yttrium (Y), indium (In), antimony (Sb), bismuth (Bi), lanthanum (La), neodymium (Nd), and samarium (Sm). The pentavalent metal element may be at least one selected from antimony (Sb), niobium (Nb), bismuth (Bi), vanadium (V), and tantalum (Ta).

Examples of the inorganic ionic conductor including phosphorus (P) and oxygen (O) are orthophosphate and pyrophosphate. For example, the inorganic ionic conductor may be pyrophosphate including a trivalent metal element or a pentavalent metal element.

This pyrophosphate may be a compound with an anion represented by Formula 4 below.

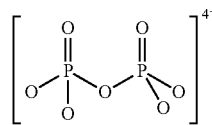

Formula 4

The inorganic ionic conductor may have a cubic or pseudo-cubic crystal structure. The term "pseudo-cubic" refers to a rhombohedral structure almost similar to the cubic structure. This crystal structure may be identified by analysis of a distance between lattice planes obtained from an X-ray diffraction test.

The inorganic ionic conductor is located at the corners and face centers of a face-centered cubic structure of metal oxide $(MO_6)$, with a phosphate group $(P_2O_7)$ being on the edges and bound to the metal oxide.

The above-described crystal structure is the same as or similar to a crystal phase of, for example, a compound of the formula $MP_2O_7$ wherein M is a tetravalent metal element, wherein M may be, for example, tin (Sn), zirconium (Zr) or titanium (Ti).

The inorganic ionic conductor may be an inorganic ionic conductor including a compound represented by Formula 5 below.

$$A_{0.5-x}B_{0.5-y}P_2O_7 \qquad \text{Formula 5}$$

In Formula 5, A is a trivalent metal element;
B is a pentavalent metal element;
x is a number from 0 to 0.45; and
y is a number from 0 to 0.45;
In an embodiment, x may be a number from 0 to 0.2, and y may be a number from 0 to 0.2.

In Formula 5, the trivalent metal element may be at least one selected from aluminum (Al), iron (Fe), gallium (Ga), yttrium (Y), indium (In), antimony (Sb), bismuth (Bi), lanthanum (La), neodymium (Nd), and samarium (Sm). The pentavalent metal element may be at least one selected from antimony (Sb), niobium (Nb), bismuth (Bi), vanadium (V), and tantalum (Ta).

The inorganic ionic conductor may be synthesized, for example in the form of $A^{III}_{0.5-x}B^{V}_{0.5}P_2O_7$ or $A^{III}_{0.5}B^{V}_{0.5-x}P_2O_7$, wherein charge compensation by the trivalent metal element or pentavalent metal element may lead to cation deficiency, which allows more proton ions to dissolve in the inorganic ionic conductor through reaction with water vapor, and accordingly the inorganic ionic conductor may have improved ionic conductivity.

The inorganic ionic conductor may not have a structure satisfying a stoichiometric composition. As shown in Formula 5 above, the inorganic ionic conductor may have the trivalent metal element and the pentavalent metal element in amounts far less than the amounts of phosphorous and oxygen. Due to this structure, as compared with a compound with a satisfactory stoichiometric composition in terms of Sn and In, such as $Sn_{0.9}In_{0.1}P_2O_7$, more defects in the inorganic conductor lattice occur, and consequently a concentration of proton ions introducible into the compound may be increased, thus further improving the ionic conductivity of the inorganic ionic conductor.

The inorganic ionic conductor may exhibit a peak conductivity in different temperature regions depending on the specific pentavalent metal used. Accordingly, inorganic ionic conductors with improved conductivities at different temperature ranges may be prepared by varying the kind of the pentavalent metal element. For example, the inorganic ionic conductor may be prepared for use in a temperature range of about 100 to about 400° C. When the pentavalent metal element is Ta, the inorganic ionic conductor may exhibit improved conductivity characteristics in an intermediate temperature range of about 200-400° C. When the pentavalent metal element is Sb or Nb, the inorganic ionic conductor may exhibit improved conductivity characteristics in a low temperature range of about 100-200° C.

As described above, the inorganic ionic conductor may have the same crystal structure as a crystal phase of a compound of the formula $MP_2O_7$ (wherein M is a tetravalent metal element, for example, tin (Sn), zirconium (Zr), or titanium (Ti)), and may have improved conductivity characteristics with this crystal structure.

The crystalline phase of $MP_2O_7$ shows a main peak at a Bragg angle 2θ of about 15 to 25 degrees in the X-ray diffraction spectrum to a CuK-α X-ray wavelength of 1.541 Å. The main peak is a diffraction peak with a maximum intensity.

For example, when a main peak of the inorganic ionic conductor at the Bragg angle 2θ to the CuK-α X-ray wavelength of 1.541 Å appears in a region where a main peak of the crystal phase of $SnP_2O_7$ appears, the inorganic ionic conductor may have high conductivity. The inorganic ionic conductor may be $Fe_{0.4}Ta_{0.5}P_2O_7$, $Fe_{0.35}Nb_{0.5}P_2O_7$, or $In_{0.4}Sb_{0.5}P_2O_7$.

The peak region of the $SnP_2O_7$ crystal phase is at the Bragg angles of 2θ of 15° to 25°, and 30° to 40° to the CuK-α X-ray wavelength of 1.541 Å, and its main peak appears at 15° to 25°.

The composition of the inorganic ionic conductor may be identified using an X-ray fluorescence spectrometer (XRF).

The inorganic ionic conductor may be, for example, $In_{0.5}Sb_{0.5}P_2O_7$, $Sb^{III}_{0.5}Sb^{V}_{0.5}P_2O_7$, $Fe_{0.5}Sb_{0.5}P_2O_7$, $Al_{0.5}Sb_{0.5}P_2O_7$, $Ga_{0.5}Sb_{0.5}P_2O_7$, $Y_{0.5}Sb_{0.5}P_2O_7$, $Bi_{0.5}Sb_{0.5}P_2O_7$, $Fe_{0.5}Nb_{0.5}P_2O_7$, $Ga_{0.5}Nb_{0.5}P_2O_7$, $Y_{0.5}Nb_{0.5}P_2O_7$, $La_{0.5}Nb_{0.5}P_2O_7$, $Nd_{0.5}Nb_{0.5}P_2O_7$, $Sm_{0.5}Nb_{0.5}P_2O_7$, $Fe_{0.5}Ta_{0.5}P_2O_7$, $Ga_{0.5}Ta_{0.5}P_2O_7$, $Al_{0.5}Ta_{0.5}P_2O_7$, $Bi_{0.5}Ta_{0.5}P_2O_7$, $In_{0.5}Ta_{0.5}P_2O_7$, $Sb_{0.5}Ta_{0.5}P_2O_7$, $La_{0.5}Ta_{0.5}P_2O_7$, $Sm_{0.5}Ta_{0.5}P_2O_7$, $Y_{0.5}Ta_{0.5}P_2O_7$, $In_{0.45}Sb_{0.5}P_2O_7$, $In_{0.40}Sb_{0.5}P_2O_7$, $In_{0.35}Sb_{0.5}P_2O_7$, $In_{0.3}Sb_{0.5}P_2O_7$, $In_{0.5}Sb_{0.45}P_2O_7$, $In_{0.5}Sb_{0.4}P_2O_7$, $In_{0.5}Sb_{0.35}P_2O_7$, $In_{0.5}Sb_{0.3}P_2O_7$, $Fe_{0.45}Sb_{0.5}P_2O_7$, $Fe_{0.40}Sb_{0.5}P_2O_7$, $Fe_{0.35}Sb_{0.5}P_2O_7$, $Fe_{0.30}Sb_{0.5}P_2O_7$, $Fe_{0.5}Sb_{0.45}P_2O_7$, $Fe_{0.5}Sb_{0.40}P_2O_7$, $Fe_{0.5}Sb_{0.35}P_2O_7$, $Fe_{0.5}Sb_{0.3}P_2O_7$, $Fe_{0.45}Ta_{0.5}P_2O_7$, $Fe_{0.40}Ta_{0.5}P_2O_7$, $Fe_{0.35}Ta_{0.5}P_2O_7$, $Fe_{0.30}Ta_{0.5}P_2O_7$, $Fe_{0.5}Ta_{0.45}P_2O_7$, $Fe_{0.5}Ta_{0.4}P_2O_7$, $Fe_{0.5}Ta_{0.35}P_2O_7$, or $Fe_{0.5}Ta_{0.3}P_2O_7$.

The inorganic ionic conductor may have an average particle diameter of from about 1 µm to about 3 µm. When the average particle diameter of the inorganic ionic conductor is within this range, the inorganic ionic conductor may have improved dispersibility in the electrolyte membrane.

Hereinafter, a method of preparing the above-described inorganic ionic conductor, which includes a trivalent metal element, a pentavalent metal element, phosphorus (P), and oxygen (O), will be described.

First, a trivalent metal element (A) precursor, a pentavalent metal (B) precursor, and a phosphorous precursor may be mixed together to prepare a mixture.

In preparing the mixture, a solvent may be added and mixed together. When using the solvent, the components of the mixture may be more homogeneously mixed.

Non-limiting examples of the solvent are distilled water, methanol, ethanol, and isopropylalcohol. An amount of the solvent may be from about 300 parts to about 800 parts by weight based on 100 parts by weight of a trivalent metal element precursor.

When the amount of the solvent is within this range, the composition may have an appropriate viscosity, and thus may facilitate preparation of the inorganic ionic conductor.

The mixture is mixed together. This mixing process may be performed at a temperature of from about 200° C. to 300° C.

When the mixing is performed within this temperature range, the components of the composition may be homogeneously mixed together, and water may also be removed from the mixture, and thus the composition for the inorganic ionic conductor may retain an appropriate viscosity. When the composition has an appropriate viscosity, a subsequent thermal treatment may be performed efficiently without a phase separation of the composition.

Next, the mixture is thermally treated at a temperature of about 300° C. to about 1200° C., and in some embodiments, at about 450° C., and then ground into powder having a predetermined particle size, thereby obtaining the inorganic ionic conductor.

When the thermal treatment temperature of the composition is within these ranges, the inorganic ionic conductor may have improved conductivity without structural deformation. The thermal treatment time may vary depending on the thermal treatment temperature. For example, the thermal treatment may be performed within about 1 hour to about 5 hours.

The thermal treatment may be performed in an inert gas atmosphere, for example, a nitrogen atmosphere, or in an air atmosphere.

The trivalent metal element precursor may be an oxide, a chloride, a hydroxide, or a nitrate of trivalent metal A. For example, the trivalent metal element precursor may be indium oxide, antimony oxide ($Sb_2O_3$), iron oxide, aluminum oxide, gallium oxide, yttrium oxide, bismuth oxide ($Bi_2O_3$), neodymium oxide, samarium oxide, indium chloride, antimony chloride, iron chloride, aluminum chloride, gallium chloride, yttrium chloride, bismuth chloride, neodymium chloride, samarium chloride, indium hydroxide, antimony hydroxide, iron hydroxide, aluminum hydroxide, gallium hydroxide, yttrium hydroxide, bismuth hydroxide, neodymium hydroxide, samarium hydroxide, indium nitrate, antimony nitrate, iron nitrate, aluminum nitrate, gallium nitrate, yttrium nitrate, bismuth nitrate, neodymium nitrate, or samarium nitrate.

The pentavalent metal precursor may be an oxide, a chloride, a hydroxide, or a nitrate of pentavalent metal B. For example, the pentavalent metal precursor may be antimony oxide, niobium oxide, tantalum oxide, antimony hydroxide, niobium hydroxide, tantalum hydroxide, antimony chloride, niobium chloride, tantalum chloride, antimony nitrate, niobium nitrate, tantalum nitrate, vanadium nitrate, vanadium chloride, bismuth nitrate, or bismuth chloride.

The amounts of the pentavalent metal element precursor and the trivalent metal element precursor may be appropriately adjusted so as to obtain a desired inorganic ionic conductor.

The phosphorous precursor may be, for example, phosphoric acid or phosphonic acid.

As the phosphoric acid, about 8 wt % to about 100 wt % of aqueous phosphoric acid solution may be used. When using 85 wt % of aqueous phosphoric acid solution, the amount of the phosphoric acid may be from about 200 parts to about 300 parts by weight based on 100 parts by weight of the trivalent metal element precursor. When the amount of the phosphoric acid is within this range, a desired inorganic ionic conductor may be obtained in consideration of a loss of the phosphoric acid during the thermal treatment.

In the process of grinding into powder, the average particle diameter obtained is not particularly limited. For example, the product from the thermal treatment may be ground so as to have an average particle diameter of about 50 nm to about 5000 nm.

The inorganic ionic conductor may be prepared as a molded product via further processing, such as press-molding, the powder. The molded product may be used as, for example, an electrolyte.

The press-molding may be, for example, cold isostatic pressing (CIP).

The inorganic ionic conductor of Formula 5 may be prepared in the same manner as for the inorganic ionic conductor including a trivalent metal element, a pentavalent metal element, phosphorus (P), and oxygen (O), except for when using phosphoric acid as the phosphorus precursor.

The inorganic ionic conductor prepared according to the above-described method exhibit high conductivity in an intermediate temperature range of, for example, about 100° C.~400° C., in an unhumidified condition.

According to other embodiments of the present disclosure, there are provided an electrode for a fuel cell, the electrode including the above-described inorganic ionic conductor, and a fuel cell including the electrode.

In some embodiments, the electrode for a fuel cell may include the above-described inorganic ionic conductor, and a polymer. The electrode may include, for example, the above-described inorganic ionic conductor, and a catalyst layer including a polymer and a catalyst. In specific embodiments, the polymer used in the electrode is the same as the polymer described herein for electrolyte membrane.

The catalyst may be platinum (Pt), an alloy or a mixture of platinum (Pt) and at least one metal selected from gold (Au), palladium (Pd), rhodium (Ru), iridium (Ir), ruthenium (Ru), tin (Sn), molybdenum (Mo), cobalt (Co), and chromium (Cr). The Pt, the alloy, or the mixture may be supported on a carbonaceous support. For example, the catalyst may be at least one metal selected from Pt, a PtCo alloy, and a PtRu alloy. These metals may be supported on a carbonaceous support.

The catalyst layer may further include a binder.

The binder may be, for example, at least one selected from poly(vinylidenefluoride), polytetrafluoroethylene, and tetrafluoroethylene-hexafluoroethylene copolymer. An amount of the binder may be from about 0.1 parts to about 50 parts by weight based on 100 parts by weight of the catalyst. When the amount of the binder is within this range, the electrode catalyst layer may have strong binding ability to the support.

Using the electrolyte membrane and/or the electrode, a fuel cell may achieve high performance and high efficiency. The electrolyte membrane may be used as a solid electrolyte in a low-temperature SOFC (for example, 300-500° C.).

In some embodiments, the fuel cell may be a high-efficiency fuel cell with high cell potential and high output density characteristics in an intermediate temperature range and an unhumidified condition.

The fuel cell may be used for any purpose. For example, the fuel cell may be used to implement a solid oxide fuel cell (SOFC), a proton exchange membrane fuel cell (PEMFCs), and the like.

Figure 2:
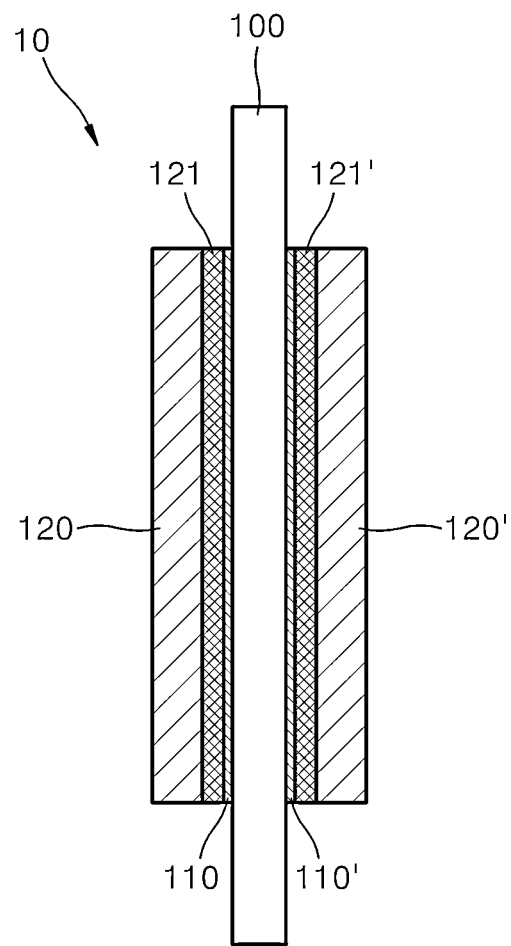
FIG. 2 is a cross-sectional diagram of an embodiment of a membrane-electrode assembly ("MEA") of the fuel cell of FIG. 1.

FIG. 1 is a perspective exploded view of an embodiment of a fuel cell 1. FIG. 2 is a cross-sectional diagram of an embodiment of a membrane-electrode assembly (MEA) of the fuel cell 1 of FIG. 1.

Referring to FIG. 1, the fuel cell 1 according to the present embodiment includes two unit cells 11 that are supported by a pair of holders 12. Each unit cell 11 includes an MEA 10, and bipolar plates 20 disposed on lateral sides of the MEA 10. Each bipolar plate 20 includes a conductive metal, carbon or the like, and operates as a current collector, while providing oxygen and fuel to the catalyst layers of the corresponding MEA 10. As illustrated, one bipolar plate may be used for two adjacent unit cells.

Although only two unit cells 11 are shown in FIG. 1, the number of unit cells 11 is not limited to two and the fuel cell 1 may have several tens or hundreds of unit cells 11, depending on the required properties of the fuel cell 1.

As shown in FIG. 2, the MEA 10 includes an electrolyte membrane 100, catalyst layers 110 and 110' disposed on lateral sides of the electrolyte membrane 100, and first gas diffusion layers 121 and 121' respectively stacked on the catalyst layers 110 and 110', and second gas diffusion layers 120 and 120' respectively stacked on the first gas diffusion layers 121 and 121'.

The electrolyte membrane 100 may be an electrolyte membrane including an inorganic ionic conductor and a polymer, according to the above described embodiments.

The catalyst layers 110 and 110' respectively operate as a fuel electrode and an oxygen electrode, each including a catalyst and a binder therein. The catalyst layers 110 and 110' may further include a material that may increase the electrochemical surface area of the catalyst.

The catalyst layers 110 and 110' may include an inorganic ionic conductor and a polymer, according to the above described embodiments.

The first gas diffusion layers 121 and 121' and the second gas diffusion layers 120 and 120' may each be formed of a material such as, for example, carbon sheet or carbon paper. The first gas diffusion layers 121 and 121' and the second gas diffusion layers 120 and 120' diffuse oxygen and fuel supplied through the bipolar plates 20 into the entire surfaces of the catalyst layers 110 and 110'.

The fuel cell 1 including the MEA 10 operates at a temperature of, for example, about 150° C. to about 300° C. Fuel such as hydrogen is supplied through one of the bipolar plates 20 into a first catalyst layer, and an oxidant such as oxygen is supplied through the other bipolar plate 20 into a second catalyst layer. Then, hydrogen is oxidized into protons in the first catalyst layer, and the protons conduct to the second catalyst layer through the electrolyte membrane 100. Then, the protons electrochemically react with oxygen in the second catalyst layer to produce water and electrical energy. Hydrogen produced from reformation of hydrocarbons or alcohols may be used as the fuel. Oxygen as the oxidant may be supplied in the form of air.

In some embodiments, the above-described inorganic ionic conductor may be used in electrochemical devices, including a catalyst support for exhaust emission purification, or as a material for vehicular parts.

Hereinafter, one or more embodiments will be described in further detail with reference to the following examples. However, these examples shall not limit the scope of the disclosed embodiments.

EXAMPLES

Preparation Example 1

Preparation of Inorganic Ionic Conductor $Fe_{0.4}Ta_{0.5}P_2O_7$

An inorganic ionic conductor having a formula of $Fe_{0.4}Ta_{0.5}P_2O_7$ was prepared in the following manner.

To obtain the composition of $Fe_{0.4}Ta_{0.5}P_2O_7$, $Fe_2O_3$, $Ta_2O_5$, and 85 wt % of $H_3PO_4$ were mixed together while adjusting a molar ratio of Fe, Ta, and P to 0.4:0.5:2.0-2.8, followed by an addition of distilled water to obtain a mixture, which was then stirred at about 300° C. to obtain a mixed paste having a high viscosity.

The mixed paste was thermally treated in a ceramic crucible at about 450° C. for about 2.5 hours.

The lump resulting from the thermal treatment was ground using a mortar to obtain $Fe_{0.4}Ta_{0.5}P_2O_7$ in powder form. In consideration of partial loss of phosphoric acid during the thermal treatment, an initial amount of the phosphoric acid was determined so as to obtain the inorganic ionic conductor with the final stoichiometric composition of $Fe_{0.4}Ta_{0.5}P_2O_7$ (hereinafter, referred to as "FTPO").

Preparation Example 2

Preparation of Inorganic Ionic Conductor $Fe_{0.35}Nb_{0.5}P_2O_7$

An inorganic ionic conductor having a formula of $Fe_{0.35}Nb_{0.5}P_2O_7$ was prepared in the following manner.

To obtain the composition of $Fe_{0.35}Nb_{0.5}P_2O_7$, $Fe_2O_3$, $Nb_2O_5$, and 85 wt % of $H_3PO_4$ were mixed together while adjusting a molar ratio of Fe, Nb, and P to 0.35:0.5:2.0-2.8, followed by an addition of distilled water to obtain a mixture, which was then stirred at about 300° C. to obtain a mixed paste having a high viscosity.

The mixed paste was thermally treated in a ceramic crucible at about 450° C. for about 2.5 hours.

The lump resulting from the thermal treatment was ground using a mortar to obtain $Fe_{0.35}Nb_{0.5}P_2O_7$ in powder form. In consideration of partial loss of phosphoric acid during the thermal treatment, an initial amount of the phosphoric acid was determined so as to obtain the inorganic ionic conductor with the final stoichiometric composition of $Fe_{0.35}Nb_{0.5}P_2O_7$.

Preparation Example 3

Preparation of Inorganic Ionic Conductor $In_{0.40}Sb_{0.5}P_2O_7$

An inorganic ionic conductor having a formula of $In_{0.40}Sb_{0.5}P_2O_7$ was prepared in the following manner.

To obtain the composition of $In_{0.40}Sb_{0.5}P_2O_7$, $In_2O_3$, $Sb_2O_5$, and 85 wt % of $H_3PO_4$ were mixed together while adjusting a molar ratio of In, Sb, and P to 0.4:0.5:2.0-2.8, followed by an addition of distilled water to obtain a mixture, which was then stirred at about 300° C. to obtain a mixed paste having a high viscosity.

The mixed paste was put into a ceramic crucible and then thermally treated at about 450° C. for about 2.5 hours.

The lump resulting from the thermal treatment was ground using a mortar to obtain $In_{0.40}Sb_{0.5}P_2O_7$ in powder form. In consideration of partial loss of phosphoric acid during the thermal treatment, an initial amount of the phosphoric acid was determined so as to obtain the inorganic ionic conductor with the final stoichiometric composition of $In_{0.40}Sb_{0.5}P_2O_7$.

Comparative Preparation Example 1

Preparation of $Sn_{0.95}Al_{0.5}P_2O_7$ $SnO_2$, $Al(OH)_3$, and 85 wt % of $H_3PO_4$ were mixed together while adjusting a molar ratio of Sn, In, and P to 0.95:0.05:2.0-2.8, followed by an addition of ion-exchanged water to obtain a mixture, which was then stirred at about 250° C. to obtain a mixed paste having a high viscosity. The mixed paste was thermally treated in an alumina crucible at about 650° C. for about 2.5 hours.

The lump resulting from the thermal treatment was ground using a mortar to obtain $Sn_{0.95}Al_{0.05}P_2O_7$ in milky powder form (hereinafter, referred to as "SAPO").

Reference Preparation Example 1

Preparation of Sulfonated Styrene-Ethylene-Butylene-Styrene Block Copolymer (sSEBS) of Formula 3a A styrene-ethylene-butylene-styrene block copolymer (SEBS) was synthesized with reference to methods disclosed in JP 2011-165347 (Reference Example 1 and Reference Example 3), and a sulfonated styrene-ethylene-butylene-styrene block copolymer (sSEBS) was synthesized using the SEBS. In the sSEBS a degree of sulfonation of the benzene ring in a styrene repeating unit was about 50 mole %.

The sSEBS had a structure represented by the following formula.

Formula 3a

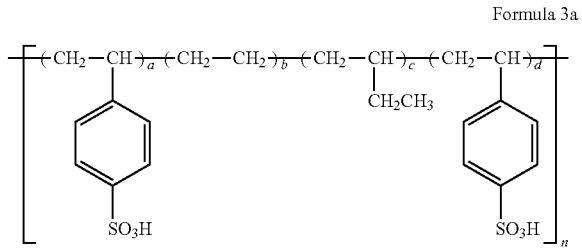

In Formula 3a, a was 9.4 mole percent, a total of b and c was 81.2 mole percent, d was 9.4 mole percent, each based on a total moles of a, b, c, and d, and n as a degree of polymerization was adjusted so as to obtain the sSEBS of Formula 3a with a number average molecular weight of about 70000.

Example 1

Manufacture of Electrolyte Membrane for Fuel Cell 90 parts by weight of FTPO and 10 parts by weight of a block copolymer represented by Formula 3a above were dissolved in 8 parts by weight of toluene and 2 parts by weight of isobutanol to prepare an electrolyte membrane composition.

The electrolyte membrane composition was ground and mixed in a ball mill, cast onto a polyethylene terephthalate (PET) film, dried at about 120° C. for about 4 hours, and then delaminated as an electrolyte membrane from the PET film.

Example 2

Preparation of Electrolyte Membrane for Fuel Cell

An electrolyte membrane was prepared in the same manner as in Example 1, except that 80 parts by weight of FTPO and 20 parts by weight of the block copolymer of Formula 3a above were used to prepare the electrolyte membrane composition.

Example 3

Preparation of Electrolyte Membrane for Fuel Cell

An electrolyte membrane was prepared in the same manner as in Example 1, except that 70 parts by weight of FTPO and 30 parts by weight of the block copolymer of Formula 3a above were used to prepare the electrolyte membrane composition.

Example 4

Preparation of Electrolyte Membrane for Fuel Cell

An electrolyte membrane was prepared in the same manner as in Example 1, except that 50 parts by weight of FTPO and 50 parts by weight of the block copolymer of Formula 3a above were used to prepare the electrolyte membrane composition.

Example 5

Preparation of Electrolyte Membrane for Fuel Cell

An electrolyte membrane was prepared in the same manner as in Example 1, except that 25 parts by weight of FTPO and 75 parts by weight of the block copolymer of Formula 3a above were used to prepare the electrolyte membrane composition.

Example 6

Preparation of Electrolyte Membrane for Fuel Cell

An electrolyte membrane was prepared in the same manner as in Example 1, except that 70 parts by weight of $Fe_{0.35}Nb_{0.5}P_2O_7$ from Preparation Example 2 and 30 parts by weight of the block copolymer of Formula 3a above were used to prepare the electrolyte membrane composition.

Example 7

Preparation of Electrolyte Membrane for Fuel Cell

An electrolyte membrane was prepared in the same manner as in Example 1, except that 70 parts by weight of $In_{0.40}Sb_{0.5}P_2O_7$ from Preparation Example 3 and 30 parts by weight of the block copolymer of Formula 3a above were used to prepare the electrolyte membrane composition.

Example 8

Preparation of Electrolyte Membrane for Fuel Cell

An electrolyte membrane was prepared in the same manner as in Example 3, except that the SEBS from Reference Preparation Example 1, instead of the block copolymer of Formula 3a above, was used.

Example 9

Preparation of Electrolyte Membrane for Fuel Cell

An electrolyte membrane was prepared in the same manner as in Example 3, except that the sulfonated polyimide, and sulfonated polyetheretherketone ("S-PEEK"), instead of the block copolymer of Formula 3a above, was used. The S-PEEK was prepared according to the method disclosed in Reference Example 4 of JP 2011-165347.

Comparative Example 1

Preparation of $Sn_{0.95}Al_{0.05}P_2O_7$ (SAPO)-sSEBS Composite Membrane

70 Parts by weigh of SAPO, and 30 parts by weight of a block copolymer of Formula 3a above were dissolved in 8 parts by weight of toluene and 2 parts by weight of isobutanol to prepare an electrolyte membrane composition.

The electrolyte membrane composition was mixed in a ball mill, cast onto a PET film, dried at about 120° C. for about 4 hours, and then delaminated as an electrolyte membrane from the PET film.

Reference Example 1

Manufacture of 100% FTPO Electrolyte Membrane

An electrolyte membrane (having a thickness of about 200 μm) was manufactured using FTPO of Preparation Example 1 through CIP using a press molder.

Reference Example 2

Manufacture of 100% sSEBS Electrolyte Membrane 1 g of sSEBS from Reference Preparation Example 1 was mixed with 4.2 g of toluene and 1.4 g of isobutyl alcohol to obtain a mixture, which was then coated on a PET, dried at about 120° C. for about 4 hours, and delaminated as an electrolyte membrane from the PET film.

Reference Example 3

Manufacture of Electrolyte Membrane

An electrolyte membrane (having a thickness of about 200 μm) was manufactured using $Fe_{0.35}Nb_{0.5}P_2O_7$ of Preparation Example 2 through CIP using a press molder.

Reference Example 4

Manufacture of Electrolyte Membrane

An electrolyte membrane (having a thickness of about 200 μm) was manufactured using $In_{0.40}Sb_{0.5}P_2O_7$ of Preparation Example 3 through CIP using a press molder.

Evaluation Example 1

Measurement of Physical Characteristics of Electrolyte Membrane

Tensile strengths and elongation rates of the electrolyte membranes of Examples 1 to 5 and Reference Example 2 were measured. The results are shown in FIG. 3.

Figure 3:
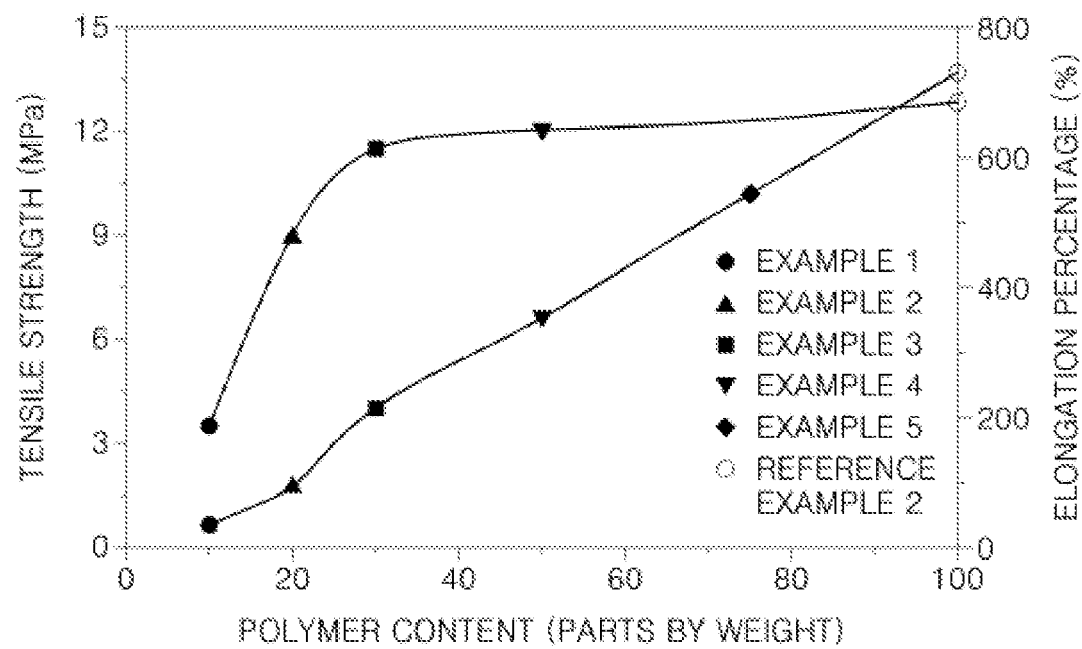
FIG. 3 is a graph of tensile strength (megaPascals) and elongation rate (percent, %) with respect to polymer content (parts by weight) in the electrolyte membranes of Examples 1 to 5 and Reference Example 2.

Referring to FIG. 3, the electrolyte membranes of Examples 1 to 5 were found to have higher tensile strengths with higher polymer (sSEBS) content, and to have high elongation rates at a polymer content of about 30 parts by weight or greater. These results indicate that the electrolyte membranes of Examples 1 to 5 have improved physical characteristics in this polymer content range.

Evaluation Example 2

Conductivity Measurement

1) Conductivities of Electrolyte Membranes of Examples 1 to 5 and Reference Example 1-2 Under Unhumidified Condition Cells were manufactured using the electrolyte membranes of Examples 1 to 5 and Reference Example 1-2 with gold (Au) electrolytes disposed on opposite sides of each electrolyte membrane. Afterward, the impedance of each cell was measured at about 50-150° C. in an unhumidified air atmosphere.

The impedance measurement was performed at a frequency range of about 10 to about $10^6$ Hz and a 10 mV AC amplitude.

Figure 4:
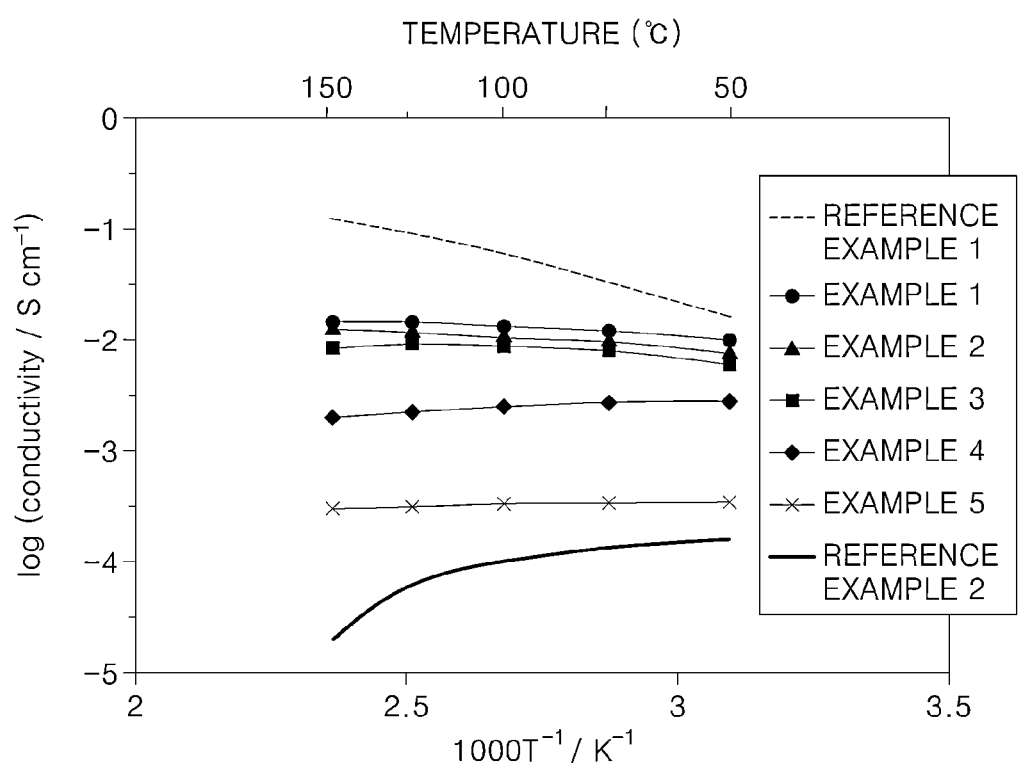
FIG. 4 is a graph of log conductivity (Siemens per centimeter, $S \cdot cm^{-1}$) versus temperature (1000 $Kelvin^{-1}$) showing the conductivities of cells using the electrolyte membranes of Examples 1 to 5 and Reference Example 2 under an unhumidified condition.

The results of a conductivity measurement using the impedance measurement on each cell are shown in FIG. 4.

Referring to FIG. 4, the electrolyte membranes of Examples 1 to 5 were found to have higher conductivities under the unhumidified condition than the electrolyte membrane of Reference Example 2.

2) Conductivities of Electrolyte Membranes of Example 3 and Comparative Example 1 Under Unhumidified Condition Cells were manufactured using the electrolyte membranes of Example 3 and Comparative Example 1 with gold (Au) electrolytes disposed on opposite sides of each electrolyte membrane. Afterward, the impedance of each cell was measured at about 50-150° C. in an unhumidified air atmosphere.

The impedance measurement was performed at a frequency range of about 10 to about $10^6$ Hz and a 10 mV AC amplitude.

Figure 5A:
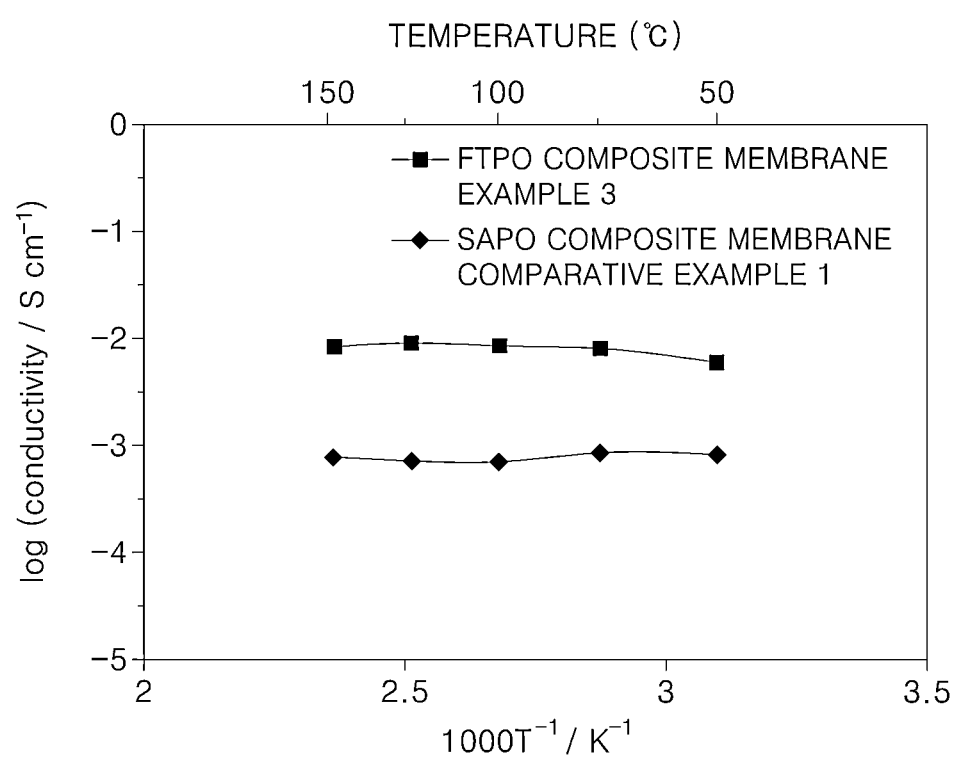
FIG. 5A is a graph of log conductivity (Siemens per centimeter, $S \cdot cm^{-1}$) versus temperature (1000 $Kelvin^{-1}$) showing the conductivities of cells using the electrolyte membranes of Example 3 and Comparative Example 1 under an unhumidified condition.

The results of a conductivity measurement using the impedance measurement on each cell are shown in FIG. 5A.

Referring to FIG. 5A, the electrolyte membranes of Example 3 was found to have a higher conductivity under the unhumidified condition than the electrolyte membrane of Comparative Example 1.

Unlike the electrolyte membrane of Comparative Example 1, since the electrolyte membrane of Example 3 has a higher conductivity by 1 order of magnitude than the electrolyte membrane of Comparative Example 1, as described above, the electrolyte membrane of Example 3 may still have a satisfactory conductivity as an electrolyte membrane when an organic component is added for the purpose of physical characteristic improvement. Accordingly, the electrolyte membrane of Example 3 may have improvements in both physical characteristics and conductivity.

3) Conductivity of Electrolyte Membrane of Example 3 Under Humidified Condition

A cell was manufactured using the electrolyte membrane of Example 3 with gold (Au) electrolytes disposed on opposite sides of the electrolyte membrane. Afterward, the impedance of each cell was measured at about 120° C. in a humidified air atmosphere at varying relative humidities.

The impedance measurement was performed at a frequency range of about 10 to about $10^6$ Hz and a 10 mV AC amplitude.

Figure 6:
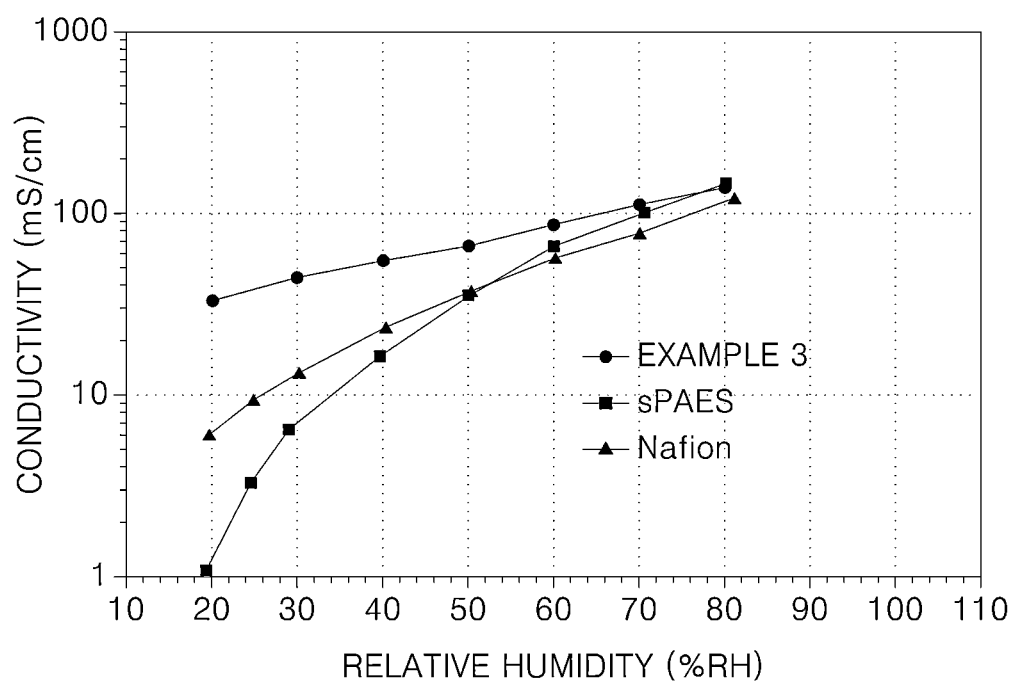
FIG. 6 is a graph of conductivity (milliSiemens per centimeter, mS/cm) versus relative humidity (percent) showing the conductivities of a cell using the electrolyte membrane of Example 3, sulfonated polyarylene ether sulfone ("sPAES"), and Nafion.

The results of a conductivity measurement using the impedance measurement on the cell are shown in FIG. 6.

For comparison, the conductivities of the electrolyte membrane of Example 3 in the humidified condition were represented in FIG. 6, along with those of a sulfonated polyarylene ether sulfone (s-PAES) electrolyte membrane (Aquafone, available from Yanjin Chemicals Co., Ltd.), and a Nafion electrolyte membrane (DuPont) in a humidified condition.

Referring to FIG. 6, the electrolyte membrane of Example 3 was found to have a higher conductivity than the sulfonated polyarylene ether sulfone (s-PAES) electrolyte membrane, and the Nafion electrolyte membrane.

4) Conductivities of Electrolyte Membranes of Examples 3, 6, and 7 and Reference Examples 1, 3 and 4 Under Unhumidified Condition Cells were manufactured using the electrolyte membranes of Examples 3, 6 and 7 and Reference Example 1, 3 and 4 with gold (Au) electrolytes disposed on opposite sides of each electrolyte membrane. Afterward, the impedance of each cell was measured at about 50-200° C. in an unhumidified air atmosphere.

The impedance measurement was performed at a frequency range of about 10 to about $10^6$ Hz and a 10 mV AC amplitude.

Figure 5B:
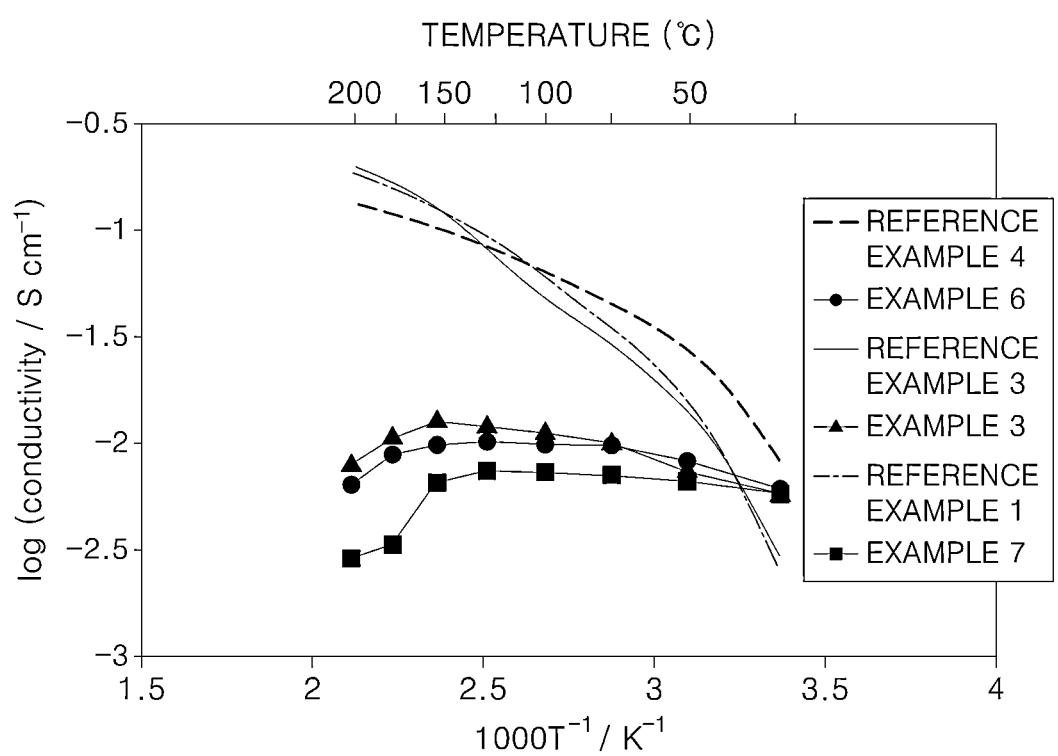
FIG. 5B is a graph of log conductivity (Siemens per centimeter, $S \cdot cm^{-1}$) versus temperature (1000 $Kelvin^{-1}$) showing the conductivities of cells using the electrolyte membranes of Examples 3, 6, and 7 and Reference Examples 1, 3 and 4 under an unhumidified condition.

The results of a conductivity measurement using the impedance measurement on each cell are shown in FIG. 5B.

Referring to FIG. 5B, the electrolyte membranes of Examples 3, 6, and 7 were found to have higher conductivities under the unhumidified condition than the electrolyte membrane of electrolyte membranes of Reference Examples 1, 3 and 4.

5) Conductivities of Electrolyte Membranes of Examples 3, 6, and 9 Under Unhumidified Condition Cells were manufactured using the electrolyte membranes of Examples 3, 8 and 9 with gold (Au) electrolytes disposed on opposite sides of each electrolyte membrane. Afterward, the impedance of each cell was measured at about 50-200° C. in an unhumidified air atmosphere.

The impedance measurement was performed at a frequency range of about 10 to about $10^6$ Hz and a 10 mV AC amplitude.

Figure 5C:
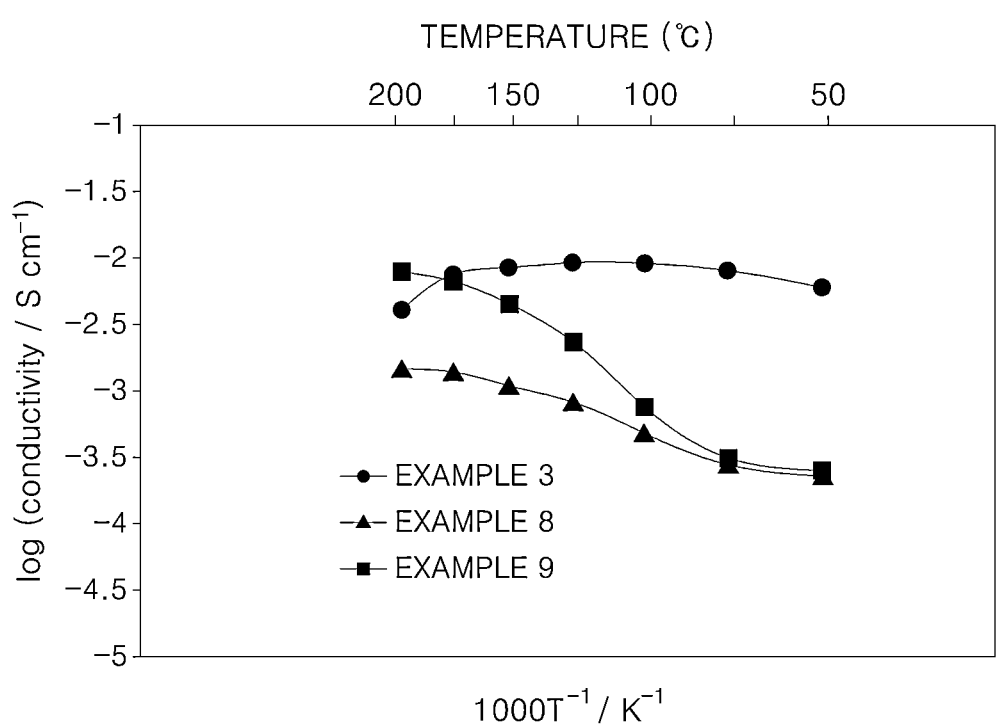
FIG. 5C is a graph of log conductivity (Siemens per centimeter, $S \cdot cm^{-1}$) versus temperature (1000 $Kelvin^{-1}$) showing the conductivities of cells using the electrolyte membranes of Examples 3, 8, and 9 under an unhumidified condition.

The results of a conductivity measurement using the impedance measurement on each cell are shown in FIG. 5C.

Referring to FIG. 5C, the electrolyte membranes of Examples 3, 8 and 9 were found to have high conductivities under the unhumidified condition.

Evaluation Example 3

Scanning Electron Microscopic (SEM) Analysis

An electrolyte membrane sample was prepared as follows.

After an electrolyte membrane composition was prepared according to Example 1, the electrolyte composition was mixed in a ball mill, cast onto a PET film, dried at about 120° C. for 4 hours, and then delaminated as an electrolyte membrane from the PET film. The electrolyte membrane had a thickness of about 100 µm.

The thickness of the electrolyte membrane was controlled by varying a gap of an opening blade during the casting.

The electrolyte membrane was analyzed using scanning electron microscopy (SEM). The results are shown in FIG. 7.

Figure 7:
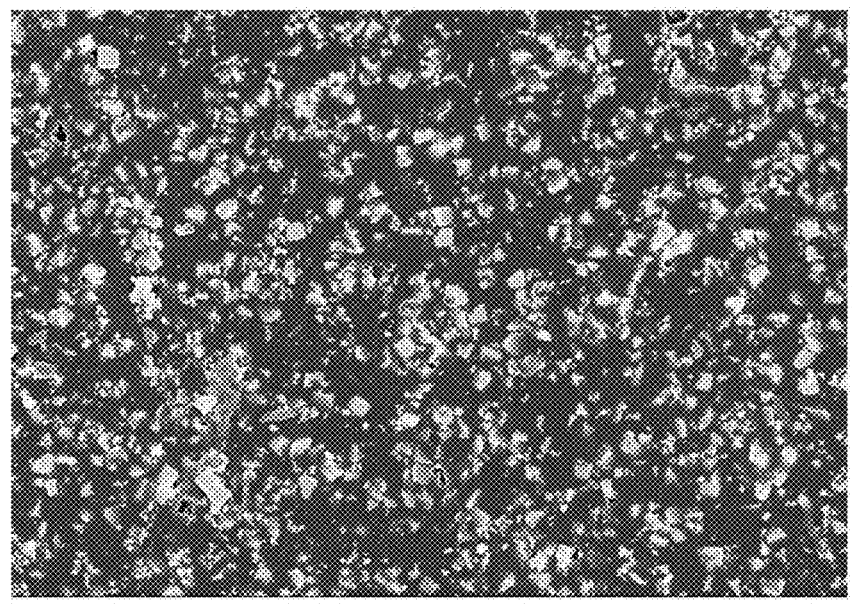
FIG. 7 is a scanning electron micrograph ("SEM") of the electrolyte membrane of Example 1.

Referring to FIG. 7, FTPO used as the inorganic ionic appears dispersed uniformly in the electrolyte membrane.

Evaluation Example 4

Measurement of Area Specific Resistance and Gas Penetration Rate

An electrolyte membrane sample was prepared as follows.

After an electrolyte membrane composition was prepared according to Example 1, the electrolyte composition was mixed in a ball mill, cast onto a PET film, dried at about 120° C. for 4 hours, and then delaminated as an electrolyte membrane from the PET film. The electrolyte membranes were prepared having a thickness of about 25 µm to about 110 µm shown in FIG. 8. The thicknesses of the electrolyte membranes were controlled by varying a gap of an opening blade during the casting.

Figure 8:
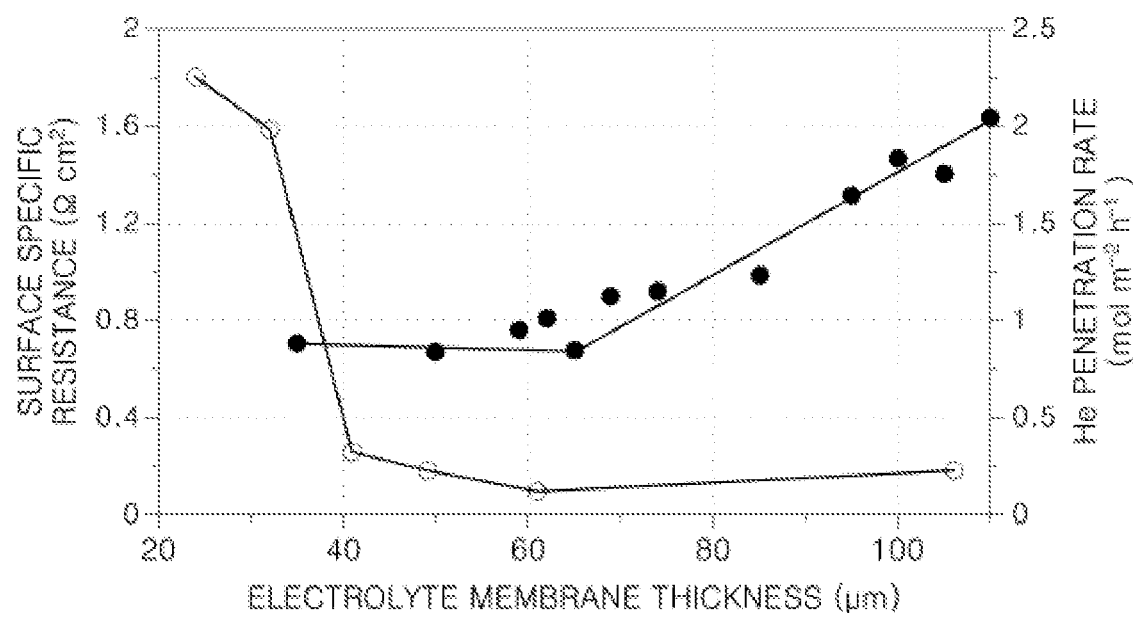
FIG. 8 is a graph of surface area specific resistance (ohms-square centimeters, $\Omega cm^2$, "ASR") and helium (He) gas penetration rate (moles per square meter-hour, $mol \cdot m^{-2} \cdot h^{-1}$) with respect to change in electrolyte membrane thickness (μm) of the electrolyte membrane of Example 1.

Area specific resistance (ASR) and helium (He) gas penetration rate of the electrolyte membrane with respect to membrane thickness were measured at about 150° C. The results are shown in FIG. 8.

The He gas penetration rate was measured at room temperature in a device with two chambers separated from each other by each electrolyte membrane. While supplying pure helium and argon into chambers, respectively, at a flow rate of about 60 ml/min, an amount of He penetrated into the argon chamber through the electrolyte membrane was measured as a He gas penetration rate, using a gas chromatograph (Shimazu, GC-8A) equipped with a thermal conductivity detector (TCD).

Evaluation Example 5

Cell Performance

1) Unhumidified Condition

A cell was manufactured using the electrolyte membrane of Example 3 with Pt/C-loaded carbon paper (used as electrodes, available from ElectroChem, 2 mg Pt/cm$^2$) attached on opposite sides of the electrolyte membrane.

The cell was placed between two Pt-mesh current collectors to form a Pt-mesh/cell/Pt-mesh stack.

While the stack was placed between upper and lower alumina tubes, the structure was gas-sealed by coating and drying an inorganic sealant on the structure.

To evaluate performance of the cell, while supplying unhumidified $H_2$ and unhumidified air to the anode and the cathode at a flow rate of about 50 ccm and about 100 ccm, respectively, the cell was operated at different temperatures, i.e., at room temperature (20-25° C.), 50° C., 75° C., 100° C., 125° C., and 150° C. to measure cell voltage and output density with respect to current density.

Figure 9A:
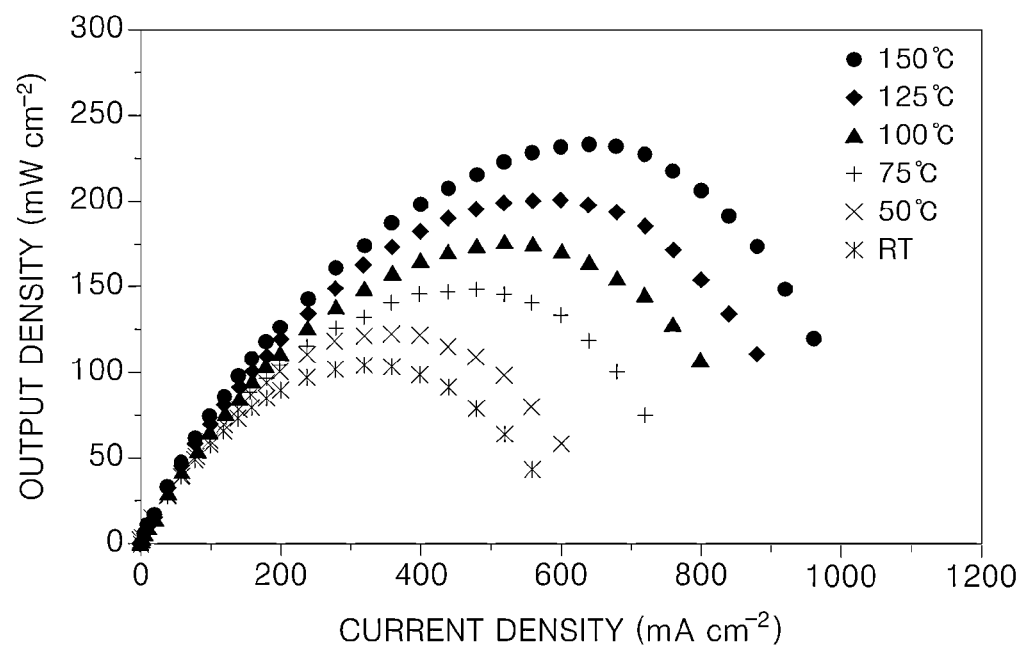
FIG. 9A is a graph of output density (milliWatts per square centimeter, $mW \cdot cm^{-2}$) with respect to current density (milliAmperes per square centimeter, $mA \cdot cm^{-2}$) in a cell using the electrolyte membrane of Example 3 under an unhumidified condition.
Figure 9B:
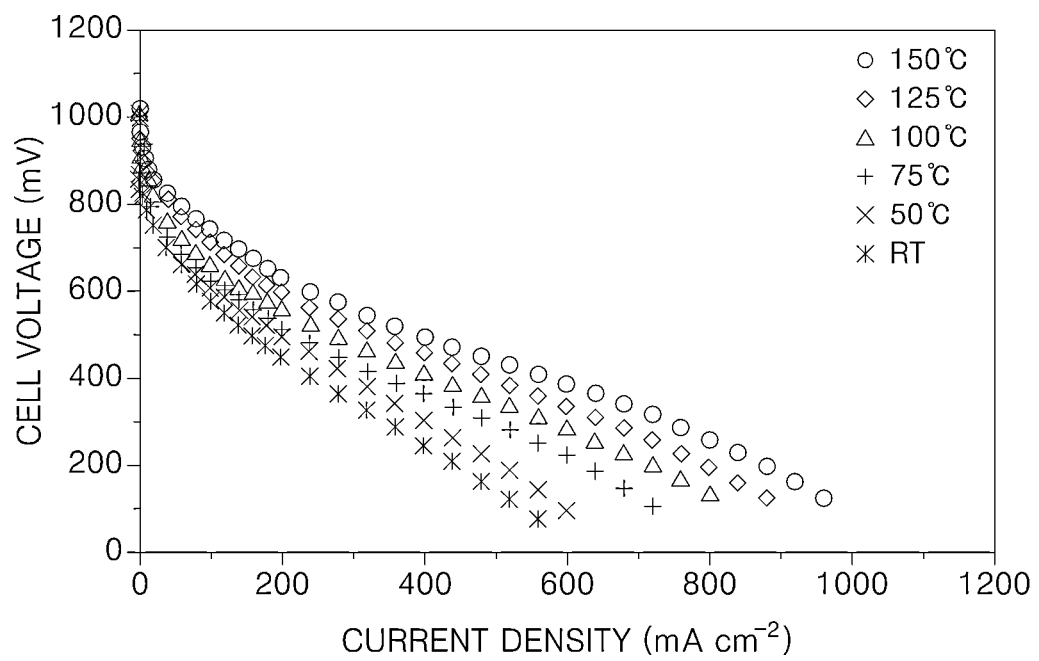
FIG. 9B is a graph of cell voltage (millivolts, mV) with respect to current density (milliAmperes per square centimeter, $mA \cdot cm^{-2}$) in the cell using the electrolyte membrane of Example 3 under the unhumidified condition.

The results of the cell potential measurement under the unhumidified atmosphere on the cell with the electrolyte membrane of Example 3 including the inorganic ionic conductor are shown in FIGS. 9A and 9B.

FIG. 9A is a graph of output density with respect to current density in the cell using the electrolyte membrane of Example 3 in the unhumidified condition. FIG. 9B is a graph of cell voltage with respect to current density in the cell using the electrolyte membrane of Example 3 in the unhumidified condition. In FIGS. 9A and 9B, "RH" refers to room temperature, e.g., 20° C.

2) Humidified Condition

A cell was manufactured using the electrolyte membrane of Example 3 with Pt/C-loaded carbon paper (used as electrodes, available from ElectroChem, 2 mg Pt/cm$^2$) attached on opposite sides of the electrolyte membrane.

The cell was placed between two Pt-mesh current collectors to form a Pt-mesh/cell/Pt-mesh stack.

While the stack was placed between upper and lower alumina tubes, the structure was gas-sealed by coating and drying an inorganic sealant on the structure.

To evaluate performance of the cell, while supplying $H_2$ and air to the anode and the cathode at a flow rate of about 50 ccm and about 100 ccm, respectively, the cell was operated at a controlled temperature of about 150° C. at varying relative humidities of 0.5%, 1.6%, 2.6%, and 6.6%, to measure cell voltage and output density with respect to current density.

Figure 10A:
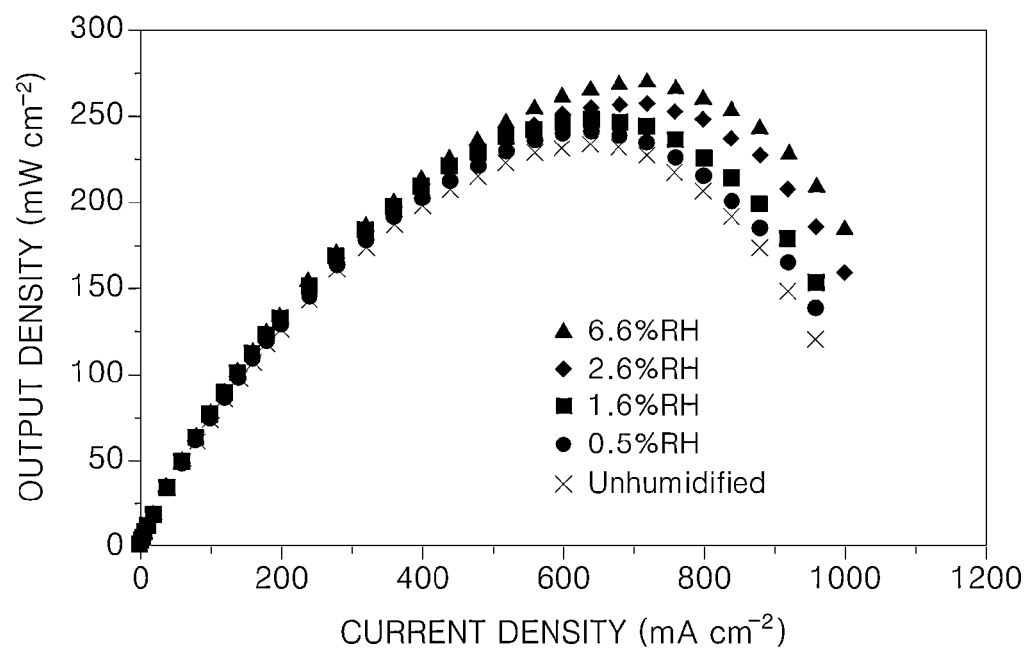
FIG. 10A is a graph of output density (milliWatts per square centimeter, $mW \cdot cm^{-2}$) with respect to current density (milliAmperes per square centimeter, mA·cm$^{-2}$) in a cell using the electrolyte membrane of Example 3 under a humidified condition.
Figure 10B:
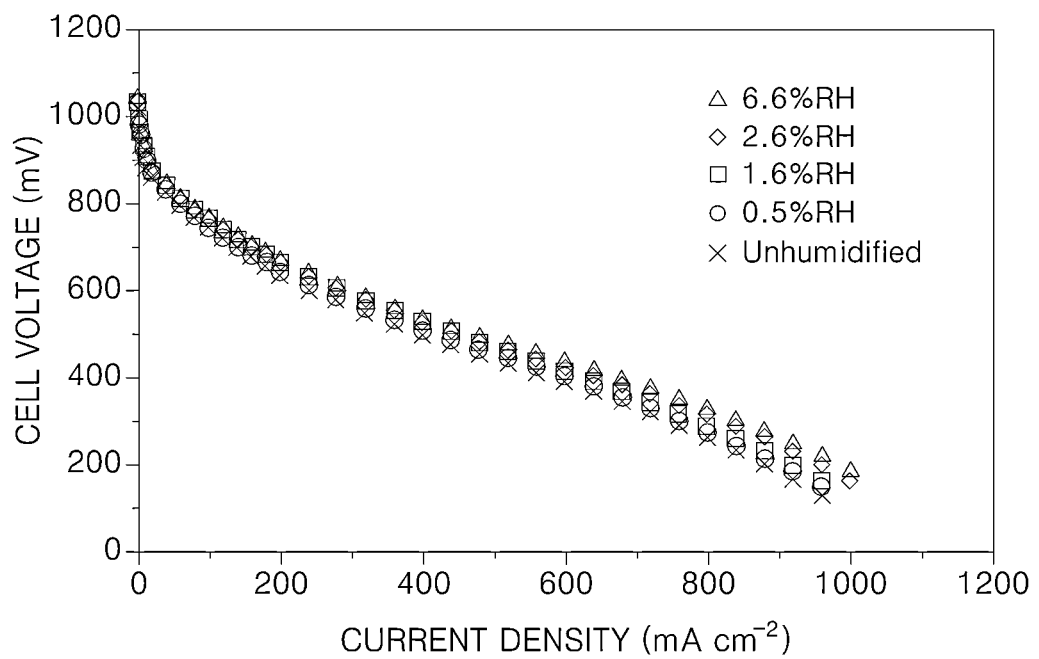
FIG. 10B is a graph of cell voltage (millivolts, mV) with respect to current density (milliAmperes per square centimeter, mA·cm$^{-2}$) in the cell using the electrolyte membrane of Example 3 under the humidified condition.

The results of the cell potential measurement under the humidified atmosphere on the cell with the electrolyte membrane of Example 3 including the inorganic ionic conductor are shown in FIGS. 10A and 10B.

FIG. 10A is a graph of output density with respect to current density in the cell using the electrolyte membrane of Example 3 in the humidified condition. FIG. 10B is a graph of cell voltage with respect to current density in the cell using the electrolyte membrane of Example 3 in the humidified condition. In FIGS. 10A and 10B, "RH" refers to relative humidity.

Referring to FIGS. 9A, 9B, 10A, and 10B, the cell using the electrolyte membrane of Example 3 was found to have improved cell voltage and output density characteristics both in an unhumidified condition and a humidified condition at a temperature of from room temperature to about 150° C.

As described above, according to the one or more of the above embodiments, the electrolyte membrane for a fuel cell is thermally and mechanically stable, and has high conductivity both in a low-humid condition and in an unhumidified condition at a wide range of temperatures. A fuel cell with improved efficiency man be manufactured using the electrolyte membrane.

It shall be understood that the exemplary embodiments described herein shall be considered in a descriptive sense only and not for purposes of limitation. Descriptions of features, advantages, or aspects within each embodiment should be considered as available for other similar features, advantages, or aspects in other embodiments.

What is claimed is:

1. An electrolyte membrane for a fuel cell, comprising:
an inorganic ionic conductor comprising a trivalent metal element, a pentavalent metal element, phosphorus, and oxygen; and a polymer wherein the inorganic ionic conductor is represented by Formula 4:

$$A_{0.5-x}B_{0.5-y}P_2O_7 \qquad \text{Formula 4}$$

wherein, in Formula 4,
A is the trivalent metal element;
B is the pentavalent metal element;
x is a number from 0 to 0.45; and
y is a number from 0 to 0.45.

2. The electrolyte membrane of claim 1, wherein the polymer is at least one selected from a hydrocarbon polymer, a fluorine polymer, and a sulfonated polymer.

3. The electrolyte membrane of claim 1, wherein the polymer is a hydrocarbon polymer, and the hydrocarbon polymer comprises an aromatic repeating unit and an aliphatic repeating unit in a weight ratio of about 10:90 to about 50:50.

4. The electrolyte membrane of claim 3, wherein the aromatic repeating unit is a repeating unit represented by Formula 1:

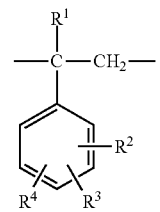

Formula 1 wherein, in Formula 1, R$^1$ is selected from a hydrogen atom, a substituted or unsubstituted C1-C10 alkyl group, and a substituted or unsubstituted C6-C20 aryl group; and R$^2$ to R$^4$ are each independently selected from a hydrogen atom, a substituted or unsubstituted C1-C10 alkyl group, a substituted or unsubstituted C6-C20 aryl group, and a substituted or unsubstituted C4-C20 carbocyclic group.

5. The electrolyte membrane of claim 1, wherein the polymer is at least one selected from a styrene-alkylene-styrene copolymer, a polyarylene ether sulfone, polyphenylsulfone, polysulfone, polyetheretherketone, and a polyimide.

6. The electrolyte membrane of claim 1, wherein the polymer is a styrene-alkylene-styrene copolymer represented by Formula 2:

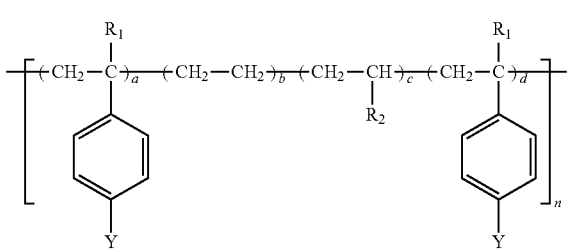

Formula 2 wherein, in Formula 2, R$_1$ and R$_2$ are each independently selected from a hydrogen atom, a substituted or unsubstituted C1-C10 alkyl group, and a substituted or unsubstituted C6-C20 aryl group, Y is at least one selected from —SO$_3$H, —PO$_3$H, —NH$_2$, —COOH, and a salt thereof, a is about 5 to about 15 mole percent, a total of b and c is about 70 to about 85 mole percent, and c is about 5 to about 15 mole percent, and d is about 5 to about 15 mole percent, each based on a total moles of a, b, c, and d, b and c are not both zero, and n is a degree of polymerization and is about 5 to about 500.

7. The electrolyte membrane of claim 1, wherein the polymer is a styrene-ethylene-butylene-styrene block copolymer represented by Formula 3:

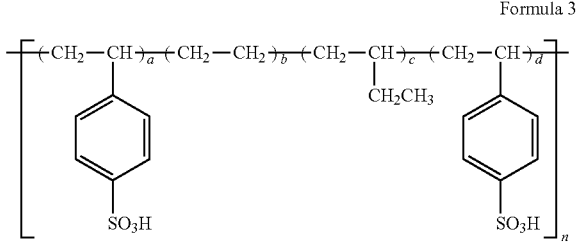

Formula 3 wherein, in Formula 3, a is about 5 to 15 mole percent, a total of b and c is about 70 to 85 mole percent, c is about 5 to 15 mole percent, d is about 5 to 15 mole percent, each based on a total moles of a, b, c, and d, b and c are not both zero, and n is a degree of polymerization and is about 5 to about 500.

8. The electrolyte membrane of claim 1, wherein the polymer has an ion-conducting functional group.

9. The electrolyte membrane of claim 8, wherein the ion-conducting functional group is at least one selected from a sulfonic acid group, a phosphoric acid group, an amino group, a carboxylic acid group, and a salt of the foregoing groups.

10. The electrolyte membrane of claim 1, wherein the polymer is present in an amount from about 5 to about 99 parts by weight, based on 100 parts by weight of the electrolyte membrane.

11. The electrolyte membrane of claim 1, wherein the electrolyte membrane has a thickness of from about 15 micrometers to about 100 micrometers.

12. The electrolyte membrane of claim 1, wherein the inorganic ionic conductor has a cubic or pseudo-cubic crystal structure.

13. The electrolyte membrane of claim 1, wherein the trivalent metal element is at least one selected from aluminum, iron, gallium, yttrium, indium, antimony, bismuth, lanthanum, neodymium, and samarium.

14. The electrolyte membrane of claim 1, wherein the pentavalent metal element is at least one selected from antimony, niobium, bismuth, vanadium, and tantalum.

15. The electrolyte membrane of claim 1, wherein x and y are each independently a number from 0 to 0.2.

16. The electrolyte membrane of claim 1, wherein the trivalent metal element is at least one selected from aluminum, iron, gallium, yttrium, indium, antimony, bismuth, lanthanum, neodymium, and samarium; and the pentavalent metal element is at least one selected from antimony, niobium, bismuth, vanadium, and tantalum.

17. The electrolyte membrane of claim 1, wherein the inorganic ionic conductor is at least one selected from $In_{0.5}Sb_{0.5}P_2O_7$, $Sb^{III}_{0.5}Sb^{V}_{0.5}P_2O_7$, $Fe_{0.5}Sb_{0.5}P_2O_7$, $Al_{0.5}Sb_{0.5}P_2O_7$, $Ga_{0.5}Sb_{0.5}P_2O_7$, $Y_{0.5}Sb_{0.5}P_2O_7$, $Bi_{0.5}Sb_{0.5}P_2O_7$, $Fe_{0.5}Nb_{0.5}P_2O_7$, $Ga_{0.5}Nb_{0.5}P_2O_7$, $Y_{0.5}Nb_{0.5}P_2O_7$, $La_{0.5}Nb_{0.5}P_2O_7$, $Nd_{0.5}Nb_{0.5}P_2O_7$, $Sm_{0.5}Nb_{0.5}P_2O_7$, $Fe_{0.5}Ta_{0.5}P_2O_7$, $Ga_{0.5}Ta_{0.5}P_2O_7$, $Al_{0.5}Ta_{0.5}P_2O_7$, $Bi_{0.5}Ta_{0.5}P_2O_7$, $In_{0.5}Ta_{0.5}P_2O_7$, $Sb_{0.5}Ta_{0.5}P_2O_7$, $La_{0.5}Ta_{0.5}P_2O_7$, $Sm_{0.5}Ta_{0.5}P_2O_7$, $Y_{0.5}Ta_{0.5}P_2O_7$, $In_{0.45}Sb_{0.5}P_2O_7$, $In_{0.40}Sb_{0.5}P_2O_7$, $In_{0.35}Sb_{0.5}P_2O_7$, $In_{0.3}Sb_{0.5}P_2O_7$, $In_{0.5}Sb_{0.45}P_2O_7$, $In_{0.5}Sb_{0.4}P_2O_7$, $In_{0.5}Sb_{0.35}P_2O_7$, $In_{0.5}Sb_{0.3}P_2O_7$, $Fe_{0.45}Sb_{0.5}P_2O_7$, $Fe_{0.40}Sb_{0.5}P_2O_7$, $Fe_{0.35}Sb_{0.5}P_2O_7$, $Fe_{0.30}Sb_{0.5}P_2O_7$, $Fe_{0.5}Sb_{0.45}P_2O_7$, $Fe_{0.5}Sb_{0.40}P_2O_7$, $Fe_{0.5}Sb_{0.35}P_2O_7$, $Fe_{0.5}Sb_{0.3}P_2O_7$, $Fe_{0.45}Ta_{0.5}P_2O_7$, $Fe_{0.40}Ta_{0.5}P_2O_7$, $Fe_{0.35}Ta_{0.5}P_2O_7$, $Fe_{0.30}Ta_{0.5}P_2O_7$, $Fe_{0.5}Ta_{0.45}P_2O_7$, $Fe_{0.5}Ta_{0.4}P_2O_7$, $Fe_{0.5}Ta_{0.35}P_2O_7$, and $Fe_{0.5}Ta_{0.3}P_2O_7$.

18. The electrolyte membrane of claim 1, further comprising a proton conductor.

19. A fuel cell comprising the electrolyte membrane of claim 1.

20. An electrode for a fuel cell, comprising: an inorganic ionic conductor including a trivalent metal element, a pentavalent metal element, phosphorus, and oxygen; and a polymer wherein the inorganic ionic conductor is represented by Formula 4:

$$A_{0.5-x}B_{0.5-y}P_2O_7 \qquad \text{Formula 4}$$

wherein, in Formula 4,

A is a trivalent metal element;

B is a pentavalent metal element;

x is a number from 0 to 0.45; and y is a number from 0 to 0.45.

21. The electrode of claim 20, wherein the polymer has an ion-conducting functional group.

22. The electrode of claim 20, wherein the polymer is at least one selected from the group consisting of a hydrocarbon polymer, a fluorine polymer, and a sulfonated polymer.

23. The electrode of claim 20, wherein the polymer is a styrene-alkylene-styrene copolymer represented by Formula 2:

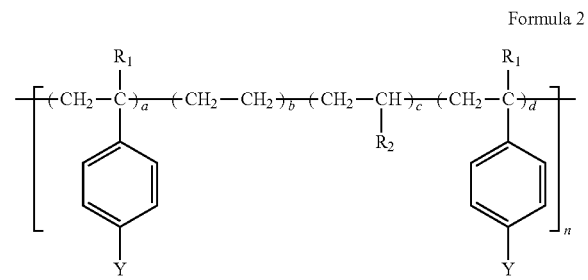

Formula 2 wherein, in Formula 2, $R_1$ and $R_2$ are each independently selected from a hydrogen atom, a substituted or unsubstituted C1-C10 alkyl group, and a substituted or unsubstituted C6-C20 aryl group, Y is at least one selected from —$SO_3H$, —$PO_3H$, —$NH_2$, —COOH, and a salt thereof, a is about 5 to 15 mole percent, a total of b and c is about 70 to 85 mole percent, c is about 5 to 15 mole percent, b and c are not both zero, d is about 5 to 15 mole percent, each based on a total moles of a, b, c, and d, and n is a degree of polymerization and is about 5 to 500.

24. The electrode of claim 20, wherein the polymer is a styrene-ethylene-butylene-styrene block copolymer represented by Formula 3:

Formula 3

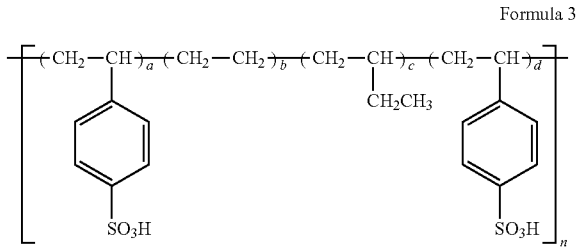

wherein, in Formula 3, a is about 5 to 15 mole percent, a total of b and c is about 70 to 85 mole percent, c is about 5 to 15 mole percent, d is about 5 to 15 mole percent, each based on a total moles of a, b, c, and d, b and c are not both zero, and n is a degree of polymerization and is about 5 to about 500.

25. The electrode of claim 20, wherein the inorganic ionic conductor is present in an amount of from about 5 to about 95 parts by weight, based on 100 parts by weight of the polymer.

26. The electrode of claim 20, wherein the trivalent metal element is at least one selected from aluminum, iron, gallium, yttrium, indium, antimony, bismuth, lanthanum, neodymium, and samarium; and the pentavalent metal element is at least one selected from antimony, niobium, bismuth, vanadium, and tantalum.

27. The electrode of claim 20, wherein the inorganic ionic conductor is at least one selected from $In_{0.5}Sb_{0.5}P_2O_7$, $Sb^{In}_{0.5}Sb^{V}_{0.5}P_2O_7$, $Fe_{0.5}Sb_{0.5}P_2O_7$, $Al_{0.5}Sb_{0.5}P_2O_7$, $Ga_{0.5}Sb_{0.5}P_2O_7$, $Y_{0.5}Sb_{0.5}P_2O_7$, $Bi_{0.5}Sb_{0.5}P_2O_7$, $Fe_{0.5}Nb_{0.5}P_2O_7$, $Ga_{0.5}Nb_{0.5}P_2O_7$, $Y_{0.5}Nb_{0.5}P_2O_7$, $La_{0.5}Nb_{0.5}P_2O_7$, $Nd_{0.5}Nb_{0.5}P_2O_7$, $Sm_{0.5}Nb_{0.5}P_2O_7$, $Fe_{0.5}Ta_{0.5}P_2O_7$, $Ga_{0.5}Ta_{0.5}P_2O_7$, $Al_{0.5}Ta_{0.5}P_2O_7$, $Bi_{0.5}Ta_{0.5}P_2O_7$, $In_{0.5}Ta_{0.5}P_2O_7$, $Sb_{0.5}Ta_{0.5}P_2O_7$, $La_{0.5}Ta_{0.5}P_2O_7$, $Sm_{0.5}Ta_{0.5}P_2O_7$, $Y_{0.5}Ta_{0.5}P_2O_7$, $In_{0.45}Sb_{0.5}P_2O_7$, $In_{0.40}Sb_{0.5}P_2O_7$, $In_{0.35}Sb_{0.5}P_2O_7$, $In_{0.3}Sb_{0.5}P_2O_7$, $In_{0.5}Sb_{0.45}P_2O_7$, $In_{0.5}Sb_{0.4}P_2O_7$, $In_{0.5}Sb_{0.35}P_2O_7$, $In_{0.5}Sb_{0.3}P_2O_7$, $Fe_{0.45}Sb_{0.5}P_2O_7$, $Fe_{0.40}Sb_{0.5}P_2O_7$, $Fe_{0.35}Sb_{0.5}P_2O_7$, $Fe_{0.30}Sb_{0.5}P_2O_7$, $Fe_{0.5}Sb_{0.45}P_2O_7$, $Fe_{0.5}Sb_{0.40}P_2O_7$, $Fe_{0.5}Sb_{0.35}P_2O_7$, $Fe_{0.5}Sb_{0.3}P_2O_7$, $Fe_{0.45}Ta_{0.5}P_2O_7$, $Fe_{0.40}Ta_{0.5}P_2O_7$, $Fe_{0.35}Ta_{0.5}P_2O_7$, $Fe_{0.30}Ta_{0.5}P_2O_7$, $Fe_{0.5}Ta_{0.45}P_2O_7$, $Fe_{0.5}Ta_{0.4}P_2O_7$, $Fe_{0.5}Ta_{0.35}P_2O_7$, and $Fe_{0.5}Ta_{0.3}P_2O_7$.

28. The electrode of claim 20, further comprising a binder.

* * * * *